US008180243B2

(12) United States Patent
Okamoto et al.

(10) Patent No.: US 8,180,243 B2
(45) **Date of Patent: *May 15, 2012**

(54) IMAGE FORMING SYSTEM AND MAINTENANCE EXECUTION PROGRAM

(75) Inventors: Kiyoshi Okamoto, Ibaraki (JP); Norifumi Miyake, Chiba (JP); Tomokazu Nakamura, Chiba (JP); Kiyoshi Watanabe, Chiba (JP); Takayuki Fujii, Tokyo (JP); Hitoshi Kato, Ibaraki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,778

(22) Filed: May 21, 2010

(65) Prior Publication Data

US 2010/0226679 A1 Sep. 9, 2010

Related U.S. Application Data

(63) Continuation of application No. 12/195,677, filed on Aug. 21, 2008, now Pat. No. 7,826,761, which is a continuation of application No. 10/692,328, filed on Oct. 23, 2003, now Pat. No. 7,426,042.

(30) Foreign Application Priority Data

Oct. 25, 2002 (JP) ................................ 2002-310999

(51) Int. Cl.
*G03G 15/00* (2006.01)
*G06F 3/12* (2006.01)
*G06K 15/00* (2006.01)

(52) U.S. Cl. ............... 399/81; 399/9; 358/1.1; 358/1.14

(58) Field of Classification Search ................ 399/9, 10, 399/24, 34, 81; 358/1.1, 1.8, 1.9, 1.14, 1.15; 347/184, 195

See application file for complete search history.

(56) References Cited

U.S. PATENT DOCUMENTS

| | | | | |
|---|---|---|---|---|
| 5,950,148 | A | 9/1999 | Nakagawa et al. | |
| 6,746,100 | B2 | 6/2004 | Imai et al. | |
| 6,865,352 | B2 | 3/2005 | Saito | |
| 7,426,042 | B2 | 9/2008 | Okamoto et al. | |
| 7,826,761 | B2 * | 11/2010 | Okamoto et al. | 399/81 |
| 2001/0034713 | A1 | 10/2001 | Nakai et al. | |
| 2002/0026505 | A1 | 2/2002 | Terry | |
| 2003/0223769 | A1 | 12/2003 | Saito | |

FOREIGN PATENT DOCUMENTS

| | | | |
|---|---|---|---|
| JP | 9-090826 | A | 4/1997 |
| JP | 2002-152442 | A | 5/2002 |

* cited by examiner

*Primary Examiner* — David Gray
*Assistant Examiner* — Joseph S Wong
(74) *Attorney, Agent, or Firm* — Rossi, Kimms & McDowell LLP

(57) ABSTRACT

There is provided an image forming system that are capable of preventing a user or operator from forgetting to carry out a maintenance operation based on required sub-maintenance items after execution of a maintenance operation based on an associated maintenance item, such as component replacement, cleaning, or adjustment. A table of maintenance items and sub-maintenance items associated with respective ones of the maintenance items is stored in a ROM. When a CPU determines that a maintenance operation based on a selected one of the maintenance items has been completed, the CPU determines whether or not there is any sub-maintenance item associated with the selected maintenance item, by referring to the table. When it is determined that there is one or more sub-maintenance items associated with the selected maintenance item, a CPU provides control to display the sub-maintenance item or items in an operating/display unit.

5 Claims, 27 Drawing Sheets

*FIG. 18A*

| MODULE NAME | ITEM | MAINTENANCE ITEM | SUB-MAINTENANCE ITEM 1 | SUB-MAINTENANCE ITEM 2 |
|---|---|---|---|---|
| FOLDER | REPLACEMENT | FOLDING ROLLER REPLACEMENT | FOLDING ROLLER PRESSURE CONTACT FORCE ADJUSTMENT<br>1ST FOLDING POSITION ADJUSTMENT | 2ND FOLDING POSITION ADJUSTMENT |
| FOLDER | REPLACEMENT | FOLDER CONVEYING ROLLER REPLACEMENT | | |
| FOLDER | REPLACEMENT | 1ST FOLDING STOPPER REPLACEMENT | 1ST FOLDING POSITION ADJUSTMENT | 2ND FOLDING POSITION ADJUSTMENT |
| FOLDER | REPLACEMENT | 2ND FOLDING STOPPER REPLACEMENT | 2ND FOLDING POSITION ADJUSTMENT | |
| FOLDER | REPLACEMENT | FOLDER CONVEYING SENSOR 1 REPLACEMENT | FOLDER CONVEYING SENSOR 1 LIGHT AMOUNT ADJUSTMENT | |
| FOLDER | REPLACEMENT | FOLDER CONVEYING SENSOR 2 REPLACEMENT | FOLDER CONVEYING SENSOR 2 LIGHT AMOUNT ADJUSTMENT | |
| | | | | |

FIG. 18B

| | | | | |
|---|---|---|---|---|
| FOLDER | ADJUSTMENT | FOLDER CONVEYING SENSOR 1 LIGHT AMOUNT ADJUSTMENT | | |
| FOLDER | ADJUSTMENT | FOLDER CONVEYING SENSOR 2 LIGHT AMOUNT ADJUSTMENT | | |
| FOLDER | ADJUSTMENT | FOLDING ROLLER PRESSURE CONTACT FORCE ADJUSTMENT | | |
| FOLDER | ADJUSTMENT | 1ST FOLDING POSITION ADJUSTMENT | 2ND FOLDING POSITION ADJUSTMENT | |
| FOLDER | ADJUSTMENT | 2ND FOLDING POSITION ADJUSTMENT | | |
| FOLDER | CLEANING | FOLDING ROLLER CLEANING | | |
| FOLDER | CLEANING | FOLDING CONVEYING ROLLER CLEANING | | |
| FOLDER | CLEANING | 1ST FOLDING STOPPER CLEANING | | |
| FOLDER | CLEANING | 2ND FOLDING STOPPER CLEANING | | |
| FOLDER | CLEANING | FOLDER CONVEYING SENSOR 1 CLEANING | FOLDER CONVEYING SENSOR 1 LIGHT AMOUNT ADJUSTMENT | |
| FOLDER | CLEANING | FOLDER CONVEYING SENSOR 2 CLEANING | FOLDER CONVEYING SENSOR 2 LIGHT AMOUNT ADJUSTMENT | |

IMAGE FORMING SYSTEM AND MAINTENANCE EXECUTION PROGRAM

CROSS-REFERENCE TO RELATED APPLICATIONS

This application is a continuation of U.S. patent application Ser. No. 12/195,677, filed Aug. 21, 2008, which is a continuation of U.S. patent application Ser. No. 10/692,328, filed Oct. 23, 2003, now U.S. Pat. No. 7,426,042, issued Sep. 16, 2008, which is based on and claims priority to Japanese Patent Application No 2002-310999, filed on Oct. 25, 2002. The documents cited in this paragraph are hereby incorporated herein by reference in their entireties, including their drawings, claims, and specifications.

BACKGROUND OF THE INVENTION

1. Field of the Invention

The present invention relates to an image forming system and a maintenance execution program that are capable of forming an image on a sheet and carrying out post-processing on the sheet.

2. Description of the Related Art

Conventionally, there has been proposed an image forming system which is comprised of an image forming apparatus, such as a copying machine, and post-processing apparatuses, such as a finisher, connected to the image forming system, for performing various types of post-processing desired by a user, such as bundle discharge processing, binding processing, folding processing, and bookbinding processing. To enable a single system to perform all these types of post-processing necessitated by a user, such as bundle discharge processing, binding processing, folding processing, and bookbinding processing, one solution is to serially connect a plurality of dedicated post-processing apparatuses for the respective types of post-processing, to the image forming apparatus.

In such an image forming system, the exteriors of the image forming apparatus and the post-processing apparatuses are provided with covers for being opened to permit access to the insides thereof when a user carries out jam recovery or a serviceman carries out system maintenance, such as component replacement, adjustment, and cleaning.

An example of the conventional image forming apparatus provided with such a cover will be described with reference to FIG. 24. FIG. 24 is a longitudinal cross-sectional view showing the arrangement of essential parts of the conventional image forming apparatus.

As shown in FIG. 24, the conventional image forming apparatus includes a printer 300 that forms an image on a sheet by electrophotography. The printer 300 is comprised of an exposure controller 110 including a polygon miller 110*a*, a photosensitive drum 111, a developing device 113, a transfer section 116, a fixing section 117, a flapper 121, discharge rollers 118, an inverting path 122, a double-sided conveying path 124, two cassettes 114, 115, and a manual sheet feeder 125. From the cassette 114 or 115, the manual sheet feeder 125, or the double-sided conveying path 124, a sheet is fed for printing and conveyed to a position between the photosensitive drum 111 and the transfer section 116, where a developing agent image formed on the photosensitive drum 111 is transferred onto the fed sheet, and the developing agent image is fixed to the sheet by the fixing section 117.

Now, the image forming apparatus is provided with a cover 351 for being opened to permit access from the outside to all of a plurality of conveying passages (including sheet conveying passages extending from the cassettes 114, 115 to the photosensitive drum 111, a conveying passage for discharging a sheet from the apparatus, the inverting path 122, the double-sided conveying path 124). This cover 351 is not opened during usual image forming operation, but opened for jamming recovery or maintenance when the apparatus is not in operation. Therefore, when the cover 351 is opened during the image forming operation, it is judged that there has occurred some abnormality, and all the operations of the apparatus are stopped.

The post-processing apparatuses are also each provided with a cover similar to the above described cover of the image forming apparatus.

For maintenance of the image forming apparatus or the post-processing apparatuses, there has been proposed a method of setting maintenance items in a time series arrangement, and configuring the maintenance items such that maintenance according to each maintenance item is properly performed based on the number of times of execution of maintenance work on the image forming apparatus or the like up to the present time to thereby control the maintenance (see e.g. Japanese Laid-Open Patent Publication (Kokai) No. 09-090826).

However, some maintenance items require a plurality of steps depending upon the contents thereof. For example, in some maintenance items, after a maintenance operation comprised of replacement of a component part, cleaning and adjustment has been carried out, it is necessary to carry out adjustment of the replaced component part and/or its related part(s), cleaning and/or confirmation of the operation.

More specifically, when a certain component part has reached a predetermined withstand number of times of operation thereof, it is replaced by a new one. Thereafter, a sheet is fed to a unit for which the component part replacement has been carried out, to adjust positions of component parts of the unit. Following the adjustment, a sheet is fed again to the unit to confirm the operation of the unit. Such adjustment of the unit after replacement of a component part thereof is carried out because mounting of the replaced component part in an improper position causes the position of the replaced component part relative to the unit to differ from that before the replacement of the component part.

Recently, however, there are cases where maintenance of image forming apparatuses is carried out by users instead of service men. In such cases, there is a fear that a user who is not familiar with a maintenance operation is not aware of the need to make adjustment of the unit after replacement of a component part thereof and forgets to make such adjustment before completing the maintenance operation.

Further, a long period of time is required from the start of a maintenance operation to completion thereof. Stoppage of the whole system over such a long period of time results in a degraded operation efficiency of the system. As one way to prevent such degradation in the operation efficiency, an image forming job is carried out without using maintenance functions after replacement of a component part, and after completion of the job, the maintenance operation which has been suspended is resumed.

According to this way, however, there is a possibility that the user forgets to resume the suspended maintenance operation after completion of the job. In such a case, there is a fear that the maintenance operation is terminated though all required maintenance items have not been carried out.

SUMMARY OF THE INVENTION

It is an object of the present invention to provide an image forming system and a maintenance program that are capable of preventing a user or operator from forgetting to carry out a maintenance operation based on required sub-maintenance items after execution of a maintenance operation based on an associated maintenance item, such as component replacement, cleaning, or adjustment.

To attain the above object, in a first aspect of the present invention, there is provided an image forming system that is capable of forming images on sheets and performing post-processing on the sheets, comprising a display device, a storage device that stores a plurality of maintenance items, and sub-maintenance items associated with respective ones of the maintenance items, a first determining device that determines whether or not a maintenance operation based on a selected one of the maintenance items has been completed, a second determining device that is responsive to a determination of the first determining device that the maintenance operation based on the selected maintenance item has been completed, for determining whether or not there is any sub-maintenance item associated with the selected maintenance item, by referring to the storage device, and a display control device that is responsive to a determination of the second determining device that there is at least one sub-maintenance item associated with the selected maintenance item, for causing the display device to display the at least one sub-maintenance item.

With the arrangement of the first aspect of the present invention, the storage device stores a plurality of maintenance items and sub-maintenance items associated with respective ones of the maintenance items, and after completion of a maintenance operation based on a selected one of the plurality of maintenance items, it is determined by referring to the storage device whether or not there is any sub-maintenance item associated with the selected maintenance item. When it is determined that there is at least one sub-maintenance item associated with the selected maintenance item, the sub-maintenance item is displayed. This prevents a user or operator from forgetting to carry out a maintenance operation based on sub-maintenance items, which need to be executed after execution of a maintenance operation based on an associated maintenance item, such as component replacement, cleaning, and adjustment.

Preferably, the sub-maintenance items are each a maintenance item based on which a maintenance operation needs to be carried out after completion of a maintenance operation based on an associated one of the maintenance items.

Also preferably, the image forming system further comprises a selecting device that is operable when a maintenance operation is to be carried out while an image forming operation is being executed, to select between execution of displaying of the at least one sub-maintenance item after completion of the image forming operation and execution of displaying of the at least one sub-maintenance item after completion of the maintenance operation.

Also preferably, the image forming system further comprises a second display control device that is operable when the maintenance operation is executed while an operation of the image forming system other than an image forming operation thereof is being executed, to display the at least one sub-maintenance item after completion of the maintenance operation.

Also preferably, the image forming system further comprises an input device that enables a user to input an instruction for termination of the maintenance operation, and wherein the first determining device is responsive to the instruction for termination of the maintenance operation via the input device, for determining that the maintenance operation has been completed.

To attain the above object, in a second aspect of the present invention, there is provided an image forming system including a plurality of processing modules that perform respective different operations, comprising, a storage device that stores a plurality of maintenance items, and sub-maintenance items associated with respective ones of the maintenance items, for each of the plurality of processing modules, a first determining device that determines whether or not a maintenance operation based on a selected one of the maintenance items for a selected one of the plurality of processing modules has been completed, a second determining device that is responsive to a determination of the first determining device that the maintenance operation based on the selected maintenance item for the selected processing module has been completed, for determining whether or not there is any sub-maintenance item associated with the selected maintenance item for the selected processing module, by referring to the storage device, and a display control device that is responsive to a determination of the second determining device that there is at least one sub-maintenance item associated with the selected maintenance item for the selected processing module, for causing the display device to display the at least one sub-maintenance item.

To attain the above object, in a third aspect of the present invention, there is provided a program for causing an image forming system to execute a maintenance method, the image forming system including a storage device that stores a plurality of maintenance items, and sub-maintenance items associated with respective ones of the maintenance items, and being capable of forming images on sheets and performing post-processing on the sheets, the method comprising a first determining step of determining whether or not a maintenance operation based on a selected one of the maintenance items has been completed, a second determining step of determining whether or not there is any sub-maintenance item associated with the selected maintenance item, by referring to the storage device, in response to a determination in the first determining step that the maintenance operation based on the selected maintenance item has been completed, and a display control step of displaying at least one sub-maintenance item associated with the selected maintenance item on a display device, in response to a determination in the second determining step that there is the at least one sub-maintenance item associated with the selected maintenance item.

Preferably, the sub-maintenance items are each a maintenance item based on which a maintenance operation needs to be carried out after completion of a maintenance operation based on an associated one of the maintenance items.

Also preferably, the program further comprises a selecting step of selecting between execution of displaying of the at least one sub-maintenance item after completion of an image forming operation and execution of displaying of the at least one sub-maintenance item after completion of the maintenance operation while the image forming operation is being executed.

Also preferably, the display control step comprises displaying the at least one sub-maintenance item after completion of the maintenance operation, when the maintenance operation is executed while an operation of the image forming system other than an image forming operation thereof is being executed.

Also preferably, the program further comprises an input step of enabling a user to input an instruction for termination of the maintenance operation, and wherein in the first determining step, it is determined that the maintenance operation has been completed when the user has inputted the instruction for termination of the maintenance operation in the input step.

To attain the above object, in a fourth aspect of the present invention, there is a program for causing an image forming system to execute a maintenance method, the image forming system including a plurality of processing modules that perform respective different operations, and a storage device that stores a plurality of maintenance items, and sub-maintenance items associated with respective ones of the maintenance items, for each of the plurality of processing modules, and being capable of carrying out maintenance operation based on one of the processing modules that is not used in a job, during execution of the job, the method comprises a first determining step of determining whether or not a maintenance operation based on a selected one of the maintenance items for a selected one of the plurality of processing modules has been completed, a second determining step of determining whether or not there is any sub-maintenance item associated with the selected maintenance item for the selected processing module, by referring to the storage device, in response to a determination in the first determining step that the maintenance operation based on the selected maintenance item for the selected processing module has been completed, and a display control step of displaying at least one sub-maintenance item associated with the selected maintenance item for the selected processing module, in response to a determination in the second determining step that there is the at least one sub-maintenance item associated with the selected maintenance item for the selected processing module.

The above and other objects of the present invention will become more apparent from the following detailed description taken in conjunction with the accompanying drawings.

BRIEF DESCRIPTION OF THE DRAWINGS

FIGS. 18A and 18B are views showing a table of maintenance items and sub-maintenance items associated therewith;

DETAILED DESCRIPTION OF THE PREFERRED EMBODIMENTS

The present invention will now be described in detail with reference to the accompanying drawings showing a preferred embodiment thereof.

Figure 1:
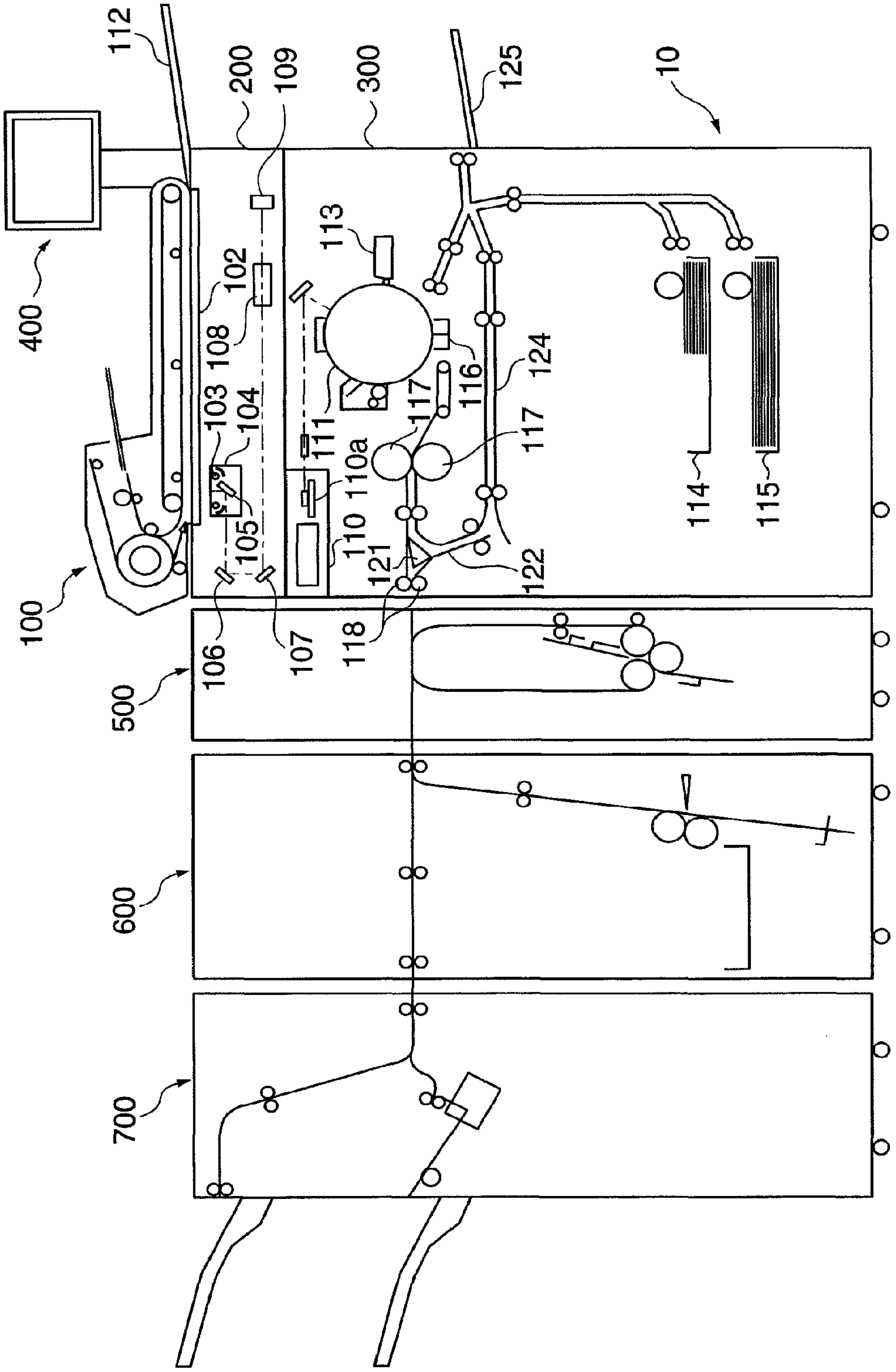
FIG. 1 is a longitudinal cross-sectional view schematically showing the arrangement of essential parts of an image forming system according to an embodiment of the present invention.

FIG. 1 is a longitudinal cross-sectional view showing the arrangement of essential parts of an image forming system according to an embodiment of the present invention.

As shown in FIG. 1, the image forming system according to the present embodiment is comprised of an image forming apparatus main unit 10, a folder 500, bookbinder 600, and a finisher 700. The image forming apparatus main unit 10 is comprised of an image reader 200 that reads images of originals, a printer 300, and an operating/display unit 400.

The image reader 200 is equipped with an original feeder 100. The original feeder 100 sequentially feeds originals set on an original tray with their front surfaces facing upward, one by one from the leading page in a leftward direction as viewed in FIG. 1, such that the originals are guided along a curved path and conveyed from left to right on a platen glass 102, followed by being discharged to an external discharge tray 112. As each original passes on the platen glass 102 from left to right, an image of the original is read by a scanner unit 104 held in a position corresponding to a moving original reading position. This reading method is generally called the moving original reading method. More specifically, as an original passes the moving original reading position, a surface of the original to be scanned is irradiated with light from a lamp 103 of the scanner unit 104, and reflected light from the original is guided to a lens 108 via mirrors 105, 106, 107. The light having passed through the lens 108 forms an image on an imaging surface of an image sensor 109.

Each original is thus conveyed so as to pass the moving original reading position from left to right, whereby scanning is performed to read the original with a direction orthogonal to the conveying direction of the original as the main scanning direction and the conveying direction of the original as the sub scanning direction. More specifically, as the original passes the moving original reading position, the image of the original is read line by line in the main scanning direction by the image sensor 109 while the original is being fed in the sub scanning direction, whereby the whole original image is read. The image optically read by the image sensor 109 is converted into image data by the same for output. The image data outputted from the image sensor 109 is subjected to predetermined processing by an image signal control section 202, referred to hereinafter, and then discharged as a video signal to an exposure control section 110 of the printer 300.

Alternatively, it is also possible to convey the original to a predetermined position on the platen glass 102 and temporarily stop the same thereat, and cause the scanner unit 104 to scan the original from left to right to thereby read the original. This reading method is the so-called stationary original reading method.

In the case of reading an original without using the original feeder 100, first, a user lifts the original feeder 100 and places an original on the platen glass 102, whereafter the scanner unit 104 is caused to scan the original from left to right to read the original. In short, when the original feeder 100 is not used for reading an original, stationary original reading is performed.

The exposure control section 110 of the printer 300 modulates a laser beam based on the input video signal and then outputs the modulated laser beam. The laser beam is irradiated onto a photosensitive drum 111 while being scanned by a polygon mirror 110*a*. On the photosensitive drum 111, an electrostatic latent image is formed according to the scanned laser beam. When stationary original reading is performed, the exposure control section 110 outputs the laser beam such that a proper image (non-mirror image) is formed.

The electrostatic latent image formed on the photosensitive drum 111 is visualized as a developer image by a developer supplied from a developing device 113. On the other hand, a sheet is fed from the cassette 114 or 115, the manual sheet feeder 125, or a double-sided conveying path 124, and conveyed to a position between the photosensitive drum 111 and a transfer section 116, in timing synchronized with the start of laser radiation, wherein the developer image formed on the photosensitive drum 111 is transferred onto the fed sheet by the transfer section 116.

The sheet having the developer image transferred thereon is conveyed to a fixing section 117, and the fixing section 117 fixes the developer image on the sheet by heating and pressing the sheet. The sheet having passed through the fixing section 117 passes through a flapper 121 and discharge rollers 118 to be discharged from the printer 300 to an associated apparatus (folder 500) adjacent to the image forming apparatus main unit 10.

When the sheet is to be discharged face-down, i.e. with an image-formed surface thereof facing downward, the sheet having passed through the fixing section 117 is temporarily guided into an inverting pass 122 by switching operation of the flapper 121, and then, after the trailing edge of the sheet has passed through the flapper 121, the sheet is switched back to be discharged from the printer 300 by the discharge rollers 118. This sheet discharge mode will be hereinafter referred to as "inverted discharge". The inverted discharge is carried out when images are sequentially formed starting from the leading page, e.g. when images read using the original feeder 100 are formed or when images outputted from a computer are formed. The sheets thus discharged by the inverted discharge are stacked in the correct page order.

When a hard sheet, such as an OHP sheet, is supplied from the manual sheet feeder 125, and an image is formed on this sheet, the sheet is not guided into the inverting path 122, and hence discharged by the discharge rollers 118 face-up, i.e. with an image-formed surface thereof facing upward.

Further, when a double-sided image forming mode for forming images on both sides of a sheet is set, the sheet is guided into the inverting path 122 by switching operation of the flapper 121, and then conveyed to the double-sided conveying path 124, followed by being fed in again between the photosensitive drum 111 and the transfer section 116 in the timing mentioned above.

The sheet discharged from the printer 300 is sent to the folder 500. The folder 500 performs processing for folding the sheet into a Z shape. For example, when the sheet is of an A3 or B4 size and at the same time the folding processing is designated, the folder 500 carries out the folding processing on the sheet discharged from the printer 300. In other cases, the sheet discharged from the printer 300 passes through the folder 500 as it is without being subjected to the folding processing, to be conveyed to the bookbinder 600, and further to the finisher 700. The bookbinder 600 performs processing for folding sheets as a bundle into half. The finisher 700 performs binding processing, etc.

Figure 2:
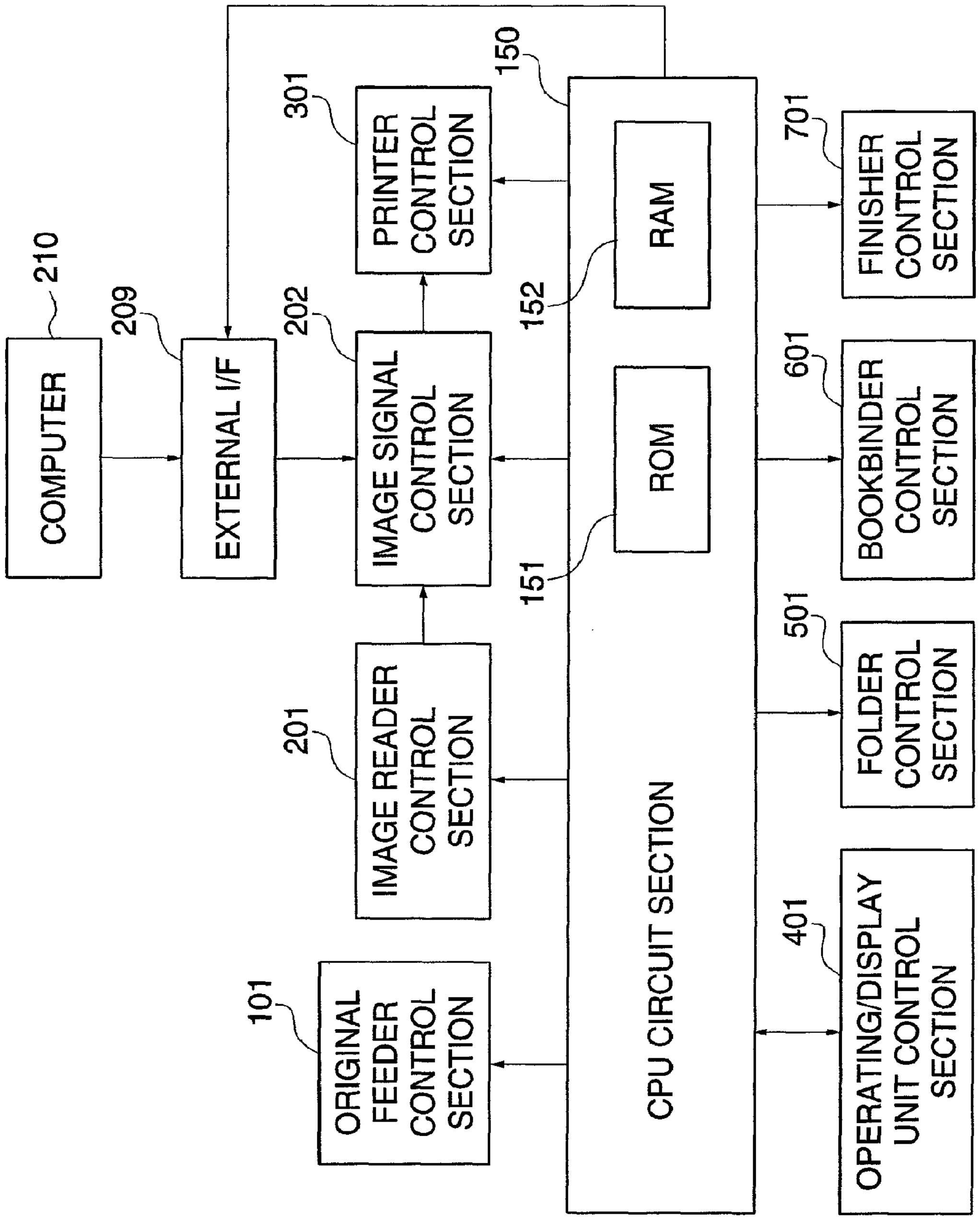
FIG. 2 is a block diagram showing the arrangement of a controller that controls the overall operation of the image forming system shown in FIG. 1.

Next, the arrangement of a controller that controls the overall operation of the present image forming system will be described with reference to FIG. 2. FIG. 2 is a block diagram showing the arrangement of the controller that controls the overall operation of the image forming system shown in FIG. 1.

As shown in the FIG. 2, the controller has a CPU circuit section 150 which incorporates a CPU (not shown), a ROM 151, and a RAM 152, and performs centralized control of sections 101, 201, 202, 209, 301, 401, 501, 601, and 701 of the image forming system, based on control programs stored in the ROM 151. The RAM 152 temporarily stores control data, and is also used as a work area for carrying out arithmetic operations involved in control processing.

The original feeder control section 101 controls the original feeder 100 in response to instructions from the CPU circuit section 150. The image reader control section 201 controls the driving of the scanner unit 104, the image sensor 109, and so forth, and transfers an analog image signal outputted from the image sensor 109 to the image signal control section 202.

The image signal control section 202 converts the analog image signal from the image sensor 109 to a digital signal, then performs various types of processing on the digital signal, and converts the processed digital signal to a video signal, followed by delivering the video signal to the printer control section 301. Further, the image signal control section 202 performs various types of processing on a digital image signal inputted from the computer 210 via the external I/F 209, and converts the processed digital image signal to a video signal, followed by delivering the video signal to the printer control section 301. The processing operations executed by the image signal control section 202 are controlled by the CPU circuit section 150. The printer control section 301 drives the exposure control section 110 based on the received video signal.

The operating/display unit control section 401 controls exchange of information between the operating/display unit 400 (appearing in FIG. 1) and the CPU circuit section 150. As described in detail hereinafter, the operating/display unit 400 includes a plurality of keys for setting various functions concerning the image formation, and a display for displaying information of the settings of the functions. The operating/display unit control section 401 delivers key signals corresponding to respective operations of the keys to the CPU circuit section 150. The operating/display unit control section 401 also provides control based on signals from the CPU circuit section 150 such that corresponding pieces of information are displayed on the display section.

The folder control section 501 is incorporated in the folder 500, and controls exchange of information with the CPU circuit section 150 to thereby control the overall operation of the folder 500.

The bookbinder control section 601 is incorporated in the bookbinder 600, and controls exchange of information with the CPU circuit section 150 to thereby control the overall operation of the bookbinder 600.

The finisher control section 701 is incorporated in the finisher 700, and controls exchange of information with the CPU circuit section 150 to thereby control the overall operation of the finisher 700. These control processes will be described in detail hereinafter.

Next, the respective arrangements of the folder 500, bookbinder 600, and the finisher 700 will be described with reference to FIG. 3, which is a view showing the internal constructions of the folder 500, the bookbinder 600, and the finisher 700.

Figure 3:
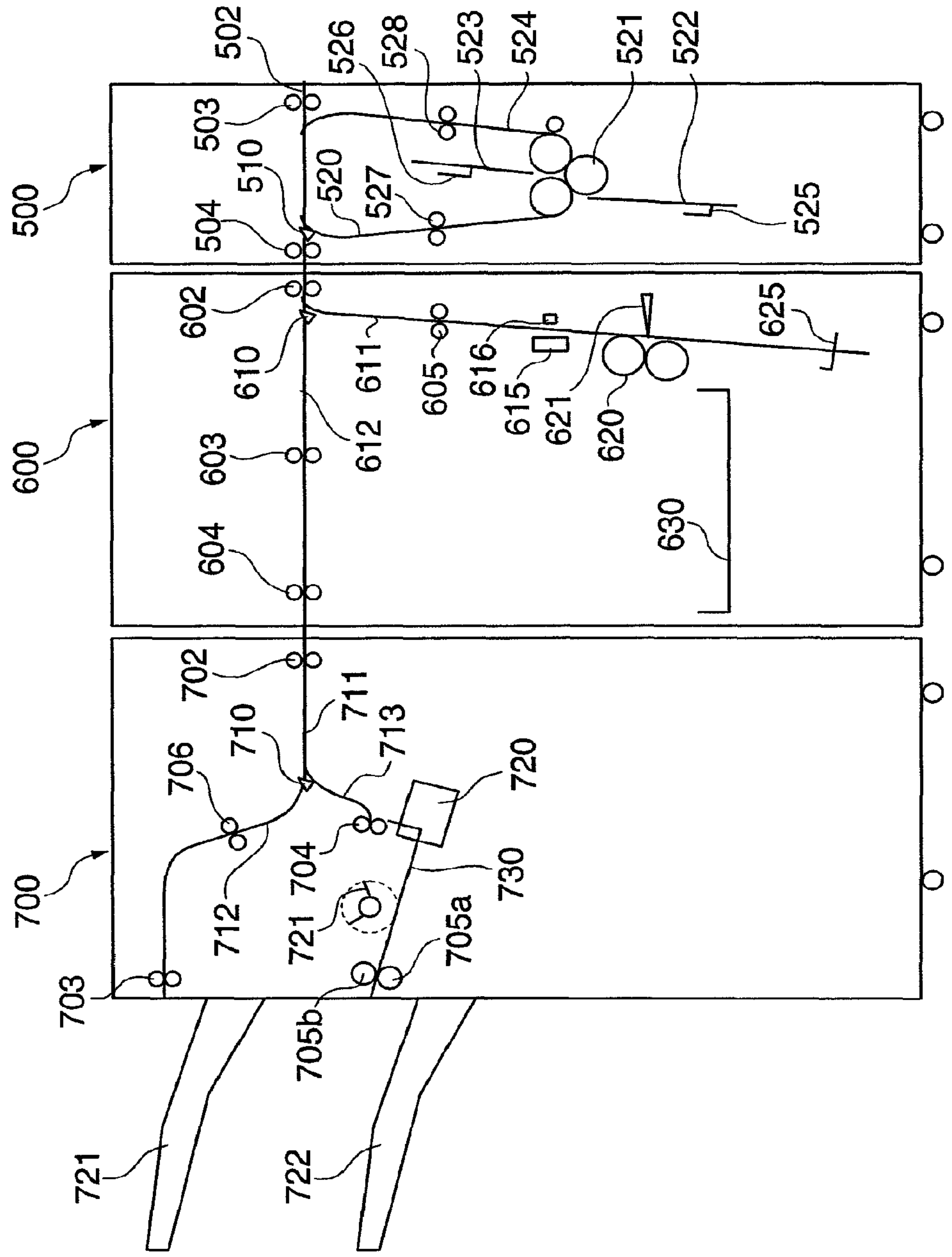
FIG. 3 is a view schematically showing the arrangement of a folder 500, a bookbinder 600, and a finisher 700 appearing in FIG. 1.

As shown in FIG. 3, the folder 500 has a horizontal folder conveying path 502 for introducing a sheet discharged from the printer 300, and guiding the sheet to the bookbinder 600. On the horizontal folder conveying path 502, there are arranged feed roller pairs 503 and 504. Further, in the outlet of the horizontal folder conveying path 502 (toward the bookbinder 600), there is arranged a folding path-selecting flapper 510. The folding path-selecting flapper 510 performs a switching operation for selectively guiding a sheet on the horizontal folder conveying path 502 to a folding path 520 or to the bookbinder 600.

When the folding processing is carried out, the folding path-selecting flapper 510 is switched on, whereby the sheet is guided to the folding path 520. The sheet guided to the folding path 520 is conveyed to a folding path 522 until the leading end thereof reaches a first folding stopper 525. Then, the sheet is guided by a folding roller 521 into a folding path 523, while being folded at a part thereof a distance of a quarter of the length of the sheet from the trailing end thereof, and conveyed until this end reaches a second folding stopper 526. Further, the sheet is guided by the folding roller 521 into a folding path 524 while being folded at a center thereof into a Z shape. On the other hand, when the folding processing is not carried out, the folding path-selecting flapper 510 is switched off, whereby the sheet is directly sent forward from the printer 300 to the bookbinder 600 via the horizontal folder conveying path 502.

The bookbinder 600 has a horizontal bookbinder conveying path 612 for introducing a sheet discharged from the printer 300 via the folder 500, and guiding the sheet to the finisher 700. On the horizontal bookbinder conveying path 612, there are arranged feed roller pairs 602, 603 and 604. Further, in the inlet of the horizontal bookbinder conveying path 612 (toward the folder 500), there is arranged a bookbinding path-selecting flapper 610. The bookbinding path-selecting flapper 610 performs a switching operation for selectively guiding a sheet on the horizontal bookbinder conveying path 612 to a bookbinding path 611 or to the finisher 700.

When the bookbinding processing is carried out, the bookbinding path-selecting flapper 610 is switched on, whereby the sheet is guided into the bookbinding path 611. Sheets from the bookbinding path 611 are each fed by a feed roller pair 605 and conveyed to a position where the leading edge of the sheet is brought into contact with a movable sheet positioning member 625, to form a bundle of sheets. At a location facing an intermediate portion of the bookbinding path 611, there are arranged two pairs of staplers 615, which cooperate with an anvil 616 to staple the bundle of the sheets at the center thereof.

A folding roller pair 620 is disposed at a location downstream of the staplers 615. At a location opposed to the folding roller pair 620, there is disposed a thrust member 621. The thrust member 621 is thrust into a sheet bundle received in the bookbinding path 611 to thereby push out the sheet bundle in between the folding roller pair 620. The sheet bundle is folded by the folding roller pair 620, and then discharged onto a bookbinding discharge tray 630.

To fold the bundle of sheets stapled by the staplers 615, after the stapling is completed, the positioning member 625 is moved downward by a predetermined distance to cause a stapled portion of the sheet bundle to be positioned at the center of the folding roller pair 620.

On the other hand, when the bookbinding processing is not carried out, the bookbinding path-selecting flapper 610 is switched off, whereby the sheet is directly sent forward from the folder 500 to the finisher 700 via the horizontal bookbinder conveying path 612.

The finisher 700 performs various types of sheet post-processing, including stapling processing for sequentially taking in sheets discharged via the folder 500 and the bookbinder 600, aligning the sheets taken in into a bundle, and stapling the trailing end of the sheet bundle, sorting processing, and non-sorting processing.

The finisher 700 has an inlet roller pair 702 for guiding sheets discharged from the printer 300 via the folder 500 and the bookbinder 600 into the inside of the finisher 700. Each sheet conveyed by the inlet roller pair 702 is guided into a finisher path 711. At a location downstream of the finisher path 711, there is disposed a path-switching flapper 710 for selectively guiding sheets into the non-sorting path 712 or to a sorting path 713.

In performing the non-sorting processing, the path-switching flapper 710 is switched on, whereby the sheets are guided into the non-sorting path 712. Then the sheets are discharged onto a sample tray 721 via a conveying roller pair 706 and a non-sorting discharge roller pair 703.

On the other hand, in performing the stapling processing or the sorting processing, the path-switching flapper 710 is switched off, whereby the sheets are guided into the sorting path 713. The sheets guided into the sorting path 713 are stacked onto an intermediate tray 730 via a sorting discharge roller pair 704.

The sheets stacked on the bookbinding discharge tray 630 as a bundle are subjected to the aligning processing, the stapling processing, and so forth, as required, followed by being discharged onto a stack tray 722 by bundle discharge rollers 705*a*, 705*b*. A stapler 720 is used in the stapling processing for stapling the sheets stacked as a bundle on the intermediate tray 730. The operation of the stapler 720 will be described in detail hereinafter. The stack tray 720 is disposed to be vertically self-movable.

Figure 4:
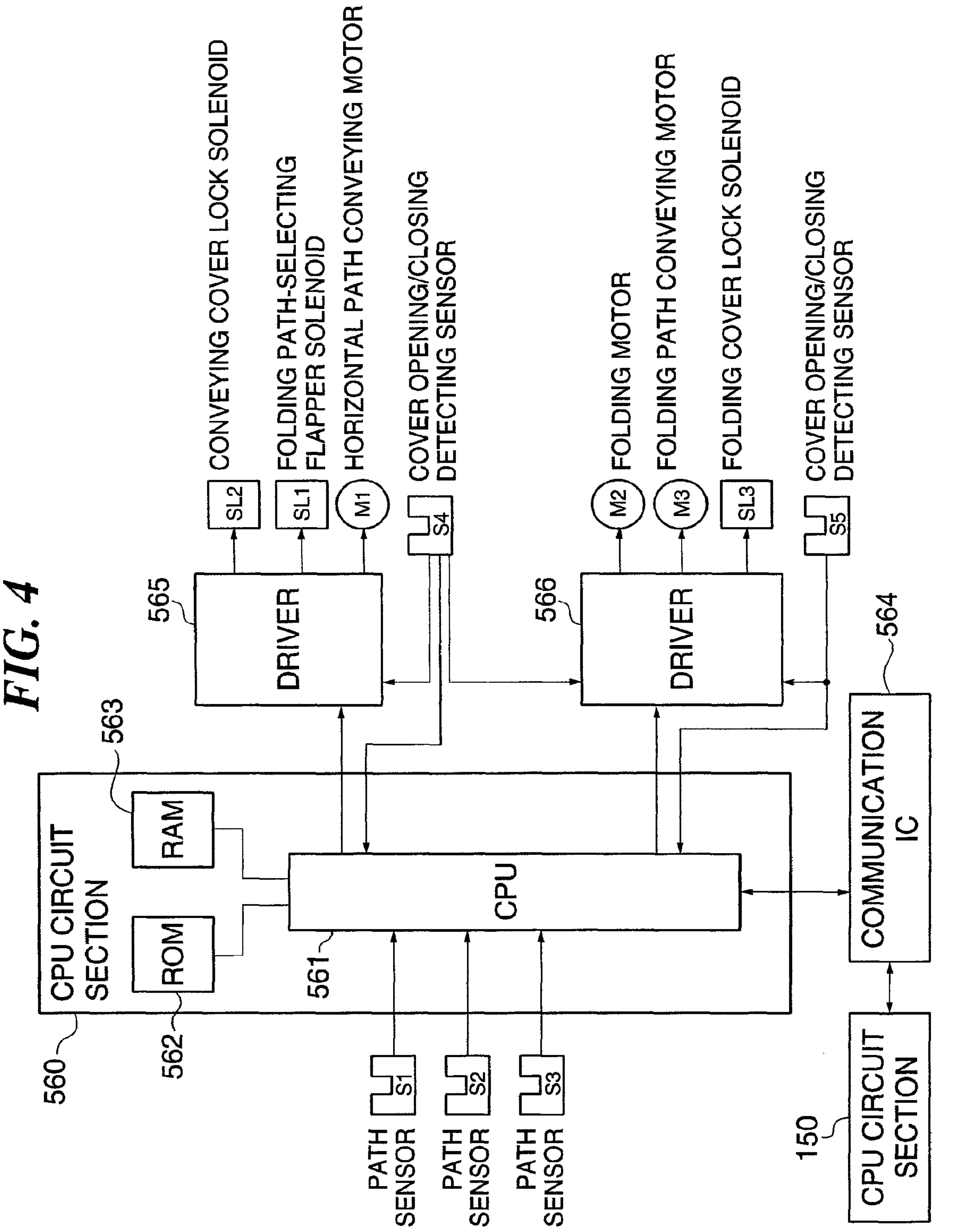
FIG. 4 is a block diagram showing the arrangement of a folder control section appearing in FIG. 2.

Next, the arrangement of the folder control section 501 that drivingly controls the folder 500 will be described in detail with reference to FIG. 4. FIG. 4 is a block diagram showing the arrangement of the folder control section 501 appearing in FIG. 2.

As shown in FIG. 4, the folder control section 501 includes a CPU circuit section 560 comprised of a CPU 561, a ROM 562, and a RAM 563. The CPU circuit section 560 communicates with the CPU circuit section 150 provided in the image forming apparatus main unit 10 via a communication IC 564, for data exchange, and executes various programs stored in the ROM 562 to drivingly control the finisher 500 according to instructions from the CPU circuit section 150.

When performing the driving control of the finisher, the CPU circuit section 560 takes in detection signals from path sensors S1, S2, S3 that detect delay of a sheet being conveyed or jamming and detection signals from cover opening/closing detecting sensors S4, S5. The CPU circuit section 560 has drivers 565, 566 connected thereto. The driver 565 drives a motor M1 and a solenoid SL1 of a conveying processing module in response to a signal from the CPU circuit section 560, and the driver 566 drives motors M2, M3 of a folding processing module in response to a signal from the CPU circuit section 560.

The motor M1 of the conveying processing module is a horizontal path conveying motor as a drive source for the conveying roller pairs 503, 504, while the solenoid SI1 is a folding path-selecting flapper solenoid that switches the folding path switching flapper 510. The motor M2 of the folding processing module is a folding motor as a drive source for the folding roller 521, while the motor M3 is a folding path conveying motor as a drive source for conveying rollers 527, 528.

The cover opening/closing detecting sensor S4 is for detecting the opening and closing of a cover 551, referred to hereinafter, and a detection signal from the cover opening/closing detecting sensor S4 is inputted to the CPU 561, and the drivers 565, 566. When it is detected from the detection signal from the cover opening/closing sensor S4 that the cover 551 is open, the power supply to the driver 565 is turned off to forcibly stop the driving of the conveying processing module. At the same time, the power supply to the folding processing module is also turned off to thereby forcibly stop the driving of the folding processing module.

The cover opening/closing detecting sensor S5 detects the opening and closing of a cover 552, referred to hereinafter, and a detection signal from the cover opening/closing detecting sensor S5 is inputted to the CPU 561 and the driver 566. When it is determined from the detection signal from the cover opening/closing detecting sensor S5 that the cover 552 is open, only the power supply to the driver 566 is turned off to thereby forcibly stop the driving of the folding processing module.

Further, there are disposed a conveying cover lock solenoid SL2 and a folding cover lock solenoid SL3 that limit the opening and closing of the covers 551, 552. The solenoids SL1, SL2 are driven by the respective associated drivers 565, 566.

Figure 5:
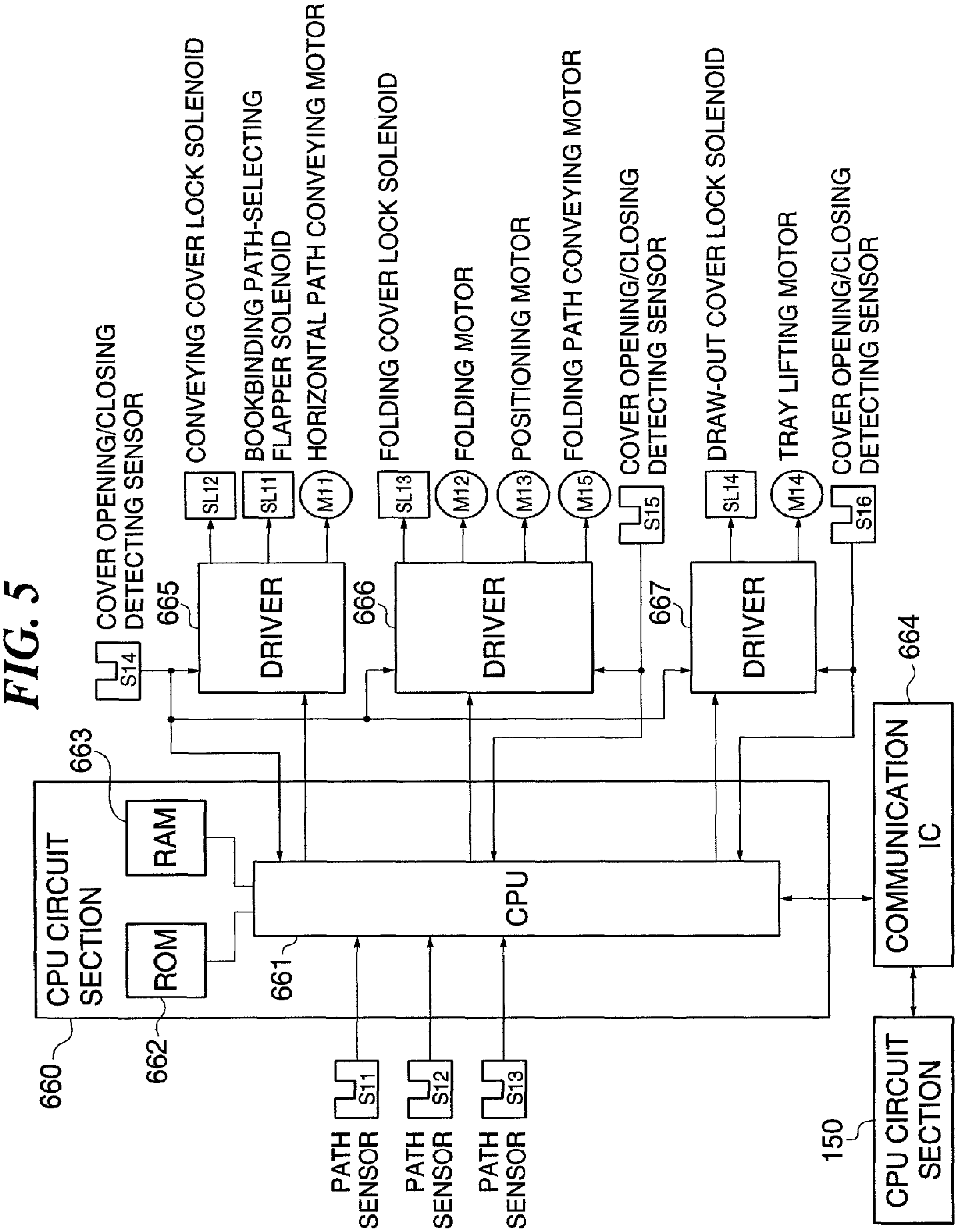
FIG. 5 is a block diagram showing the arrangement of a bookbinder control section appearing in FIG. 2.

Next, the arrangement of the bookbinder control section 601 that drivingly controls the bookbinder 600 will be described in detail with reference to FIG. 5. FIG. 5 is a block diagram showing the arrangement of the bookbinder control section 601 appearing in FIG. 2.

As shown in FIG. 5, the bookbinding control section 601 includes a CPU circuit 660 comprised of a CPU 661, a ROM 662, and a RAM 663. The CPU circuit 660 communicates with the CPU circuit section 150 provided in the image forming apparatus main unit 10 via a communication IC 664, for data exchange, and executes various programs stored in the ROM 662 to drivingly control the bookbinder 600 according to instructions from the CPU circuit section 150.

To drivingly control the bookbinder 600, the CPU circuit 660 receives detection signals from various path sensors S11, S12 and S13, and cover opening/closing detecting sensors S14, S15 and S16. Drivers 665, 666 and 667 are connected to the CPU circuit 660. The driver 665 drives a motor M11 of the conveying processing module and a solenoid SL11 in response to signals from the CPU circuit 660. The driver 666 drives motors M12, M13 of the bookbinding processing module in response to a signal from the CPU circuit 660. The driver 667 drives a motor M14 of a stacking processing module in response to a signal from the CPU circuit 660.

The motor M11 of the conveying processing module is a horizontal path conveying motor as a drive source for conveying roller pairs 602, 603, 604, while the solenoid SL11 is a bookbinding path-selecting flapper solenoid that switches the bookbinding path-selecting flapper 610. The motor M12 of the bookbinding processing module is a folding motor as a drive source for the folding roller pair 620, a motor M15 is a folding path conveying motor as a drive source for the conveying roller pair 605, and the motor M13 is a positioning motor as a drive source for the sheet positioning member 625. Further, the motor M14 of the stacking processing module is a tray lifting motor as a drive source for the bookbinding discharge tray 630.

Further, the cover opening/closing detecting sensor S14 detects the opening and closing of a cover 651, referred to hereinafter, the cover opening/closing detecting sensor S15 detects the opening and closing of a cover 652, referred to hereinafter, and the cover opening/closing detecting sensor S16 detects the opening and closing of a cover 653, referred to hereinafter.

The detection signal from the cover opening/closing detecting sensor S14 is inputted to the CPU 661 and the drivers 665, 666, 667. When it is detected from the detection signal from the cover opening/closing detecting sensor S14 that the cover 651 is open, the power supply to the driver 665 is turned off to forcibly stop the driving of the conveying processing module, and at the same time, the power supply to the drivers 666, 667 is turned off to forcibly stop the driving of the entire bookbinder 600.

The detection signal from the cover opening/closing detecting sensor S15 is inputted to the CPU 661 and the driver 667. When it is detected from the detection signal from the cover opening/closing detecting sensor S15 that the cover 652 is open, the power supply to the driver 666 is turned off to forcibly stop the driving of the bookbinding processing module.

The detection signal from the cover opening/closing detecting sensor S16 is inputted to the CPU 661 and the driver 667. When it is detected from the detection signal from the cover opening/closing detecting sensor S16 that the cover 653 is open, the power supply to the driver 667 is turned off to forcibly stop the driving of the stacking processing module.

Further, there are arranged a conveying cover lock solenoid SL12, a folding cover lock solenoid SL13, and a draw-out cover lock solenoid SL14 that limit the opening and closing of the covers 651, 652, 653, respectively. The solenoids SL12, SL13, SL14 are driven by the respective associated drivers 665, 666, 667.

Figure 6:
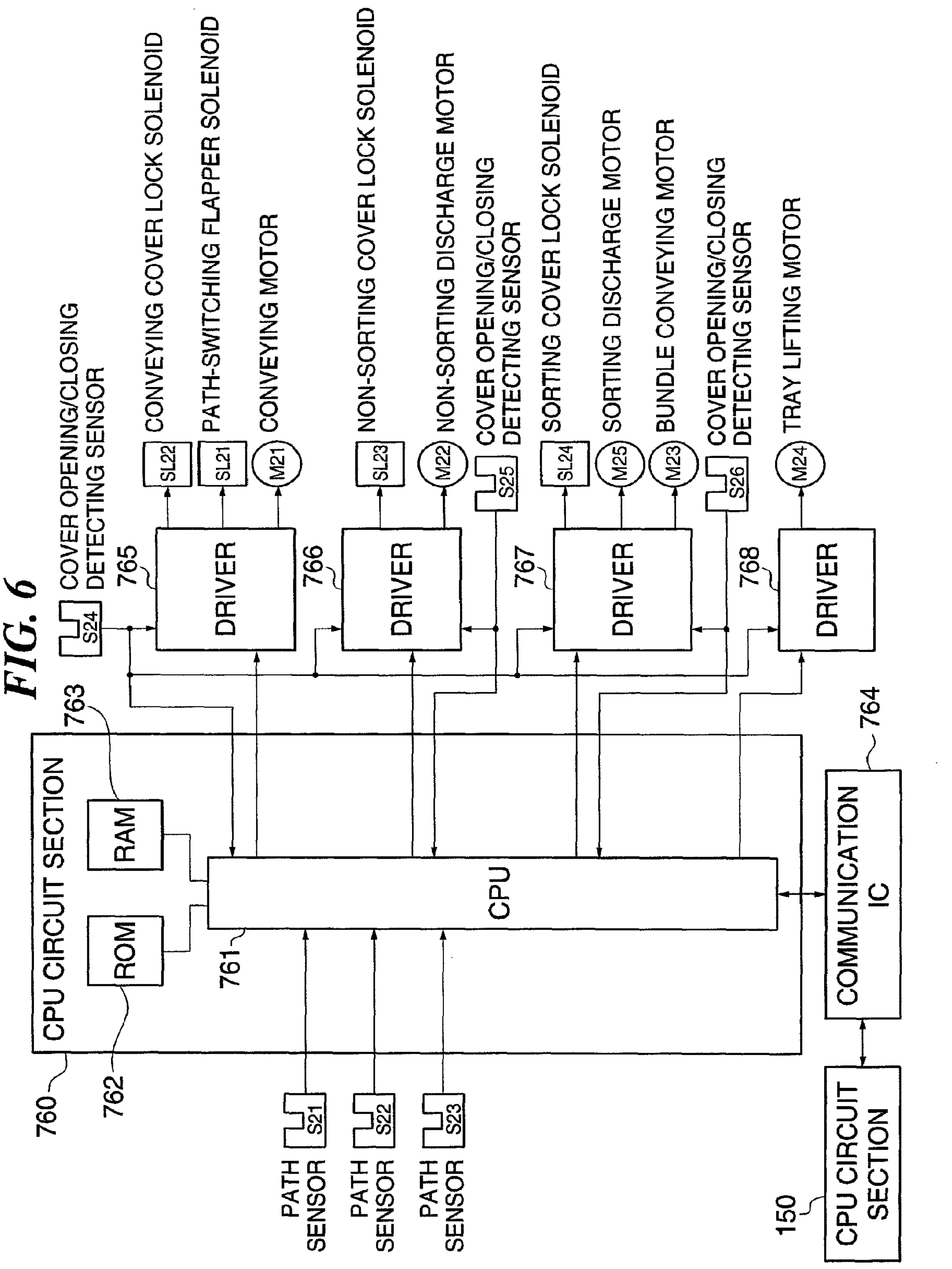
FIG. 6 is a block diagram showing the arrangement of a finisher control section appearing in FIG. 2.

Next, the arrangement of the finisher control section 701 that drivingly controls the finisher 700 will be described in detail with reference to FIG. 6. FIG. 6 is a block diagram showing the arrangement of the finisher control section appearing in FIG. 2.

As shown in FIG. 6, the finisher control section 701 includes a CPU circuit section 760 comprised of a CPU 761, a ROM 762, and a RAM 763. The CPU circuit section 760 communicates with the CPU circuit section 150 provided in the image forming apparatus main unit 10 via a communication IC 764, for data exchange, and executes various programs stored in the ROM 762 to drivingly control the finisher 700 according to instructions from the CPU circuit section 150.

To drivingly control the finisher 700, the CPU circuit section 760 receives detection signals from various path sensors S21, S22 and S23, and opening/closing detecting sensors S24, S25 and S26. Drivers 765, 766 and 767 are connected to the CPU circuit section 760. The driver 765 drives a motor M21 of the conveying processing module and a solenoid SL21 in response to a signal from the CPU circuit section 760. The driver 766 drives a motor M22 of a non-sorting discharge processing module in response to a signal from the CPU circuit section 760. The driver 767 drives motors M23, M25 of a sorting discharge processing module in response to a signal from the CPU circuit section 760. The driver 768 drives a motor M24 of a stacking processing module in response to a signal from the CPU circuit section 760.

The motor M21 of the conveying processing module is a conveying motor as a drive source for inlet roller pairs 702, while the solenoid SL21 is a path-switching flapper solenoid that switches the path switching flapper 710. The motor M22 of the non-sorting discharge processing module is a discharge motor as a drive source for the conveying roller pair 706 and the non-sorting discharge roller 703, while the motor M25 of the sorting processing module is a sorting discharge motor as a drive source for the sorting discharge roller 704. The motor M23 is a bundle conveying motor as a drive source for the bundle discharge rollers 705*a*, 705*b*. The motor M24 of the stacking processing module is a tray lifting motor as a drive source of the stack tray 722. The conveying motor M21, the non-sorting discharge motor M22, and the sorting discharge motor M25 are implemented by stepping motors, and are capable of driving the associated roller pairs for rotation at the same speed or at their own speeds by controlling duty factors of excitation pulses supplied thereto. The bundle conveying motor M23 is implemented by a DC motor.

Further, the cover opening/closing detecting sensor S24 detects the opening and closing of a cover 751, referred to hereinafter, and the detection signal from the cover opening/closing detecting sensor S24 is inputted to the CPU 761 and the drivers 765, 766, 767, 768. When it is detected from the detection signal from the cover opening/closing detecting sensor S24 that the cover 751 is open, the power supply to the driver 765 is turned off to forcibly stop the driving of the conveying processing module, and at the same time, the power supply to the drivers 766, 767, 768 is turned off to forcibly stop the driving of the entire finisher 700.

The cover opening/closing detecting sensor S25 detects the opening and closing of a cover 752, referred to hereinafter, and the detection signal from the cover opening/closing detecting sensor S25 is inputted to the CPU 761 and the driver 766. When it is detected from the detection signal from the cover opening/closing detecting sensor S25 that the cover 752 is open, the power supply to the driver 766 is turned off to forcibly stop the driving of the non-sorting processing module alone.

The cover opening/closing detecting sensor S26 detects the opening and closing of a cover 753, referred to hereinafter, and a detection signal from the over opening/closing detecting sensor S26 is inputted to the CPU 761 and the driver 767. When it is detected from the detection signal from the cover opening/closing detecting sensor S26 that the cover 753 is open, the power supply to the driver 767 is turned off to forcibly stop the driving of the sorting processing module alone.

Further, there are arranged a conveying cover lock solenoid SL22, a non-sorting cover lock solenoid SL23, and a sorting cover lock solenoid SL24 that limit the opening and closing of the covers 751, 752, 753, respectively. The solenoids SL22, SL23, SL24 are driven by the respective associated drivers 765, 766, 767.

Figure 7:
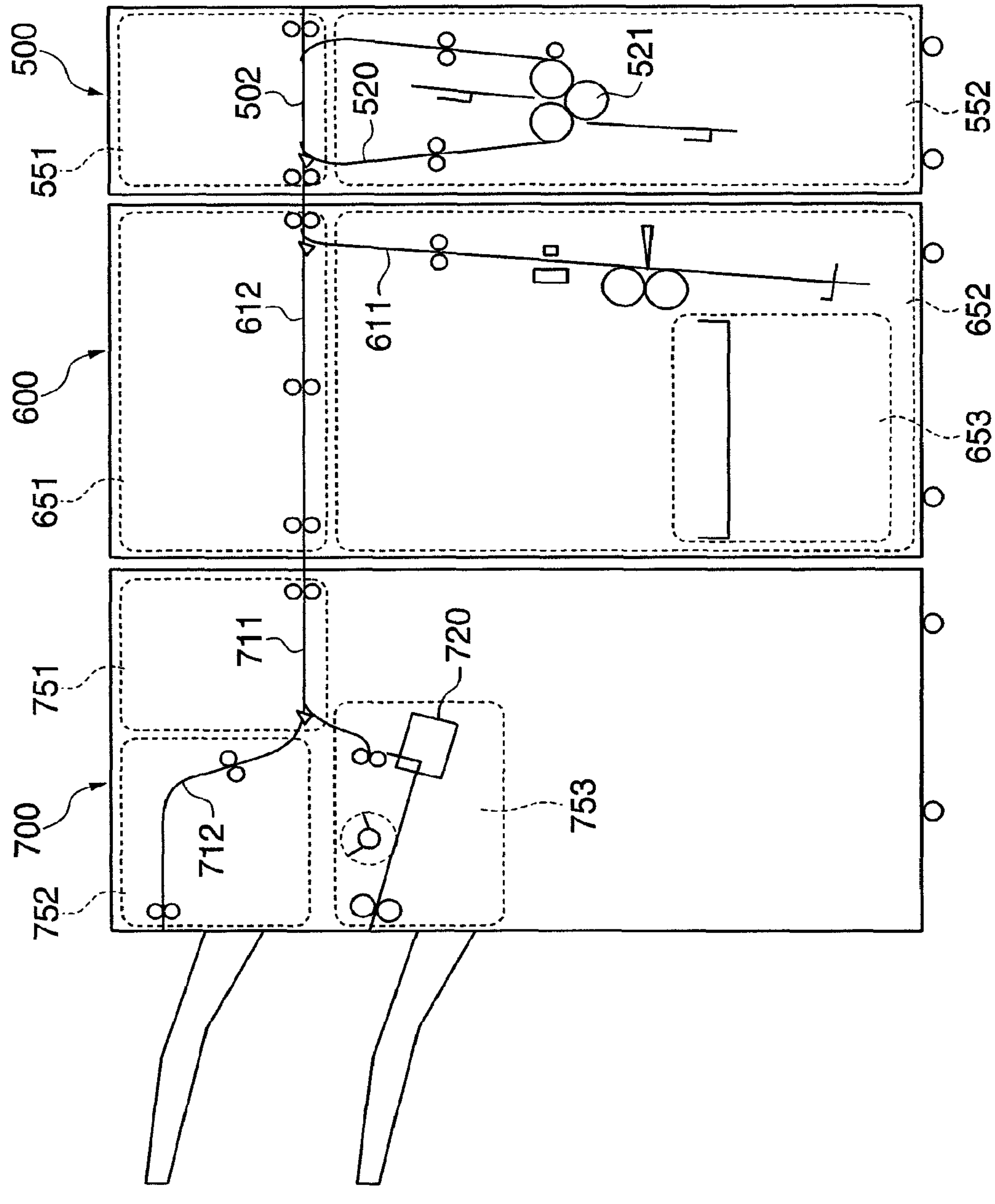
FIG. 7 is a view schematically showing the locations of exterior covers of the folder 500, the bookbinder 600, and the finisher 700.
Figure 9:
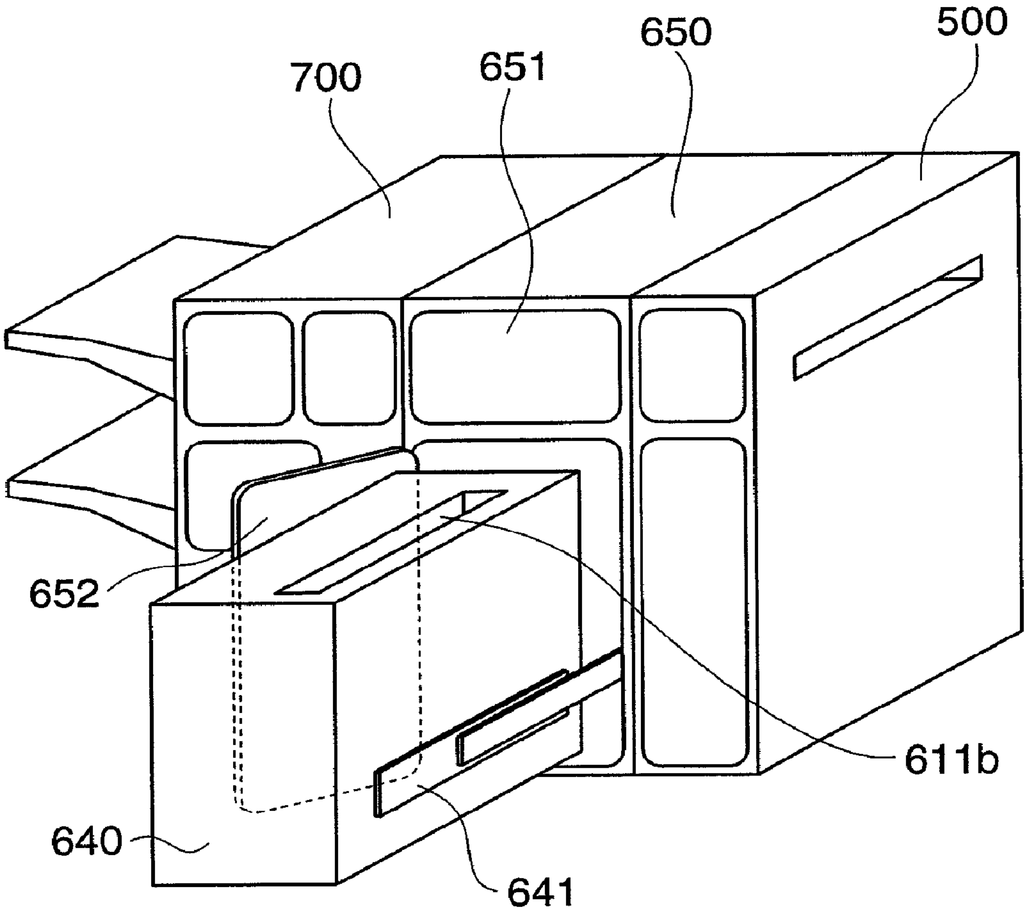
FIG. 9 is a perspective view schematically showing the bookbinder 600 in a state in which an associated module has been drawn out after opening the cover for the bookbinder 600.
Figure 10:
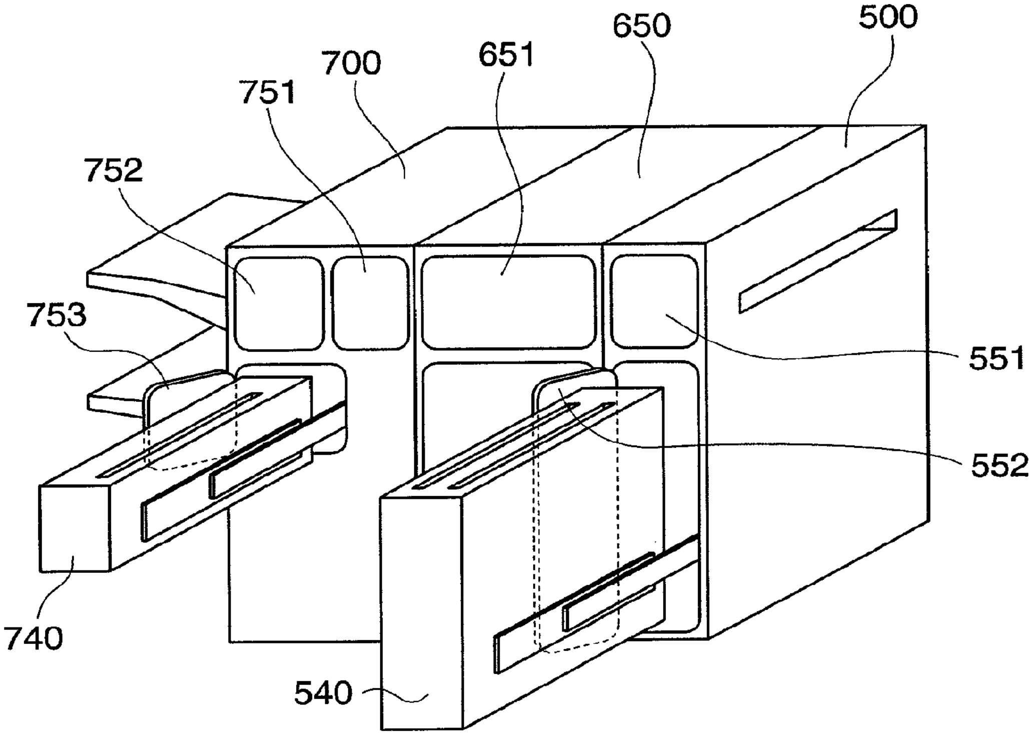
FIG. 10 is a perspective view schematically showing the folder 500 and the finisher 700 in respective opened states in which associated modules have been drawn out after opening covers thereof.

Next, a description will be given of states of the image forming system in which the respective covers of the folder 500, the bookbinder 600, and the finisher 700 are opened, and the associated modules are drawn out, with reference to FIGS. 7 to 10. FIG. 7 is a view schematically showing the locations of the covers of the folder 500, the bookbinder 600, and the finisher 700. FIGS. 8 and 9 are perspective views schematically showing respective states of the bookbinder 600 in which the cover thereof is opened and in which the associated module is drawn out, while FIG. 10 is a perspective view schematically showing a state of the folder 500 and the finisher 700 in which the associated modules are drawn out by opening the covers thereof.

As shown in FIG. 7, the folder 500 is provided with the cover 551 for covering a horizontal path section including the horizontal folder conveying path 502 and the cover 552 for covering a folding processing section including the folding path 520 and the folding roller 521. The covers 551 and 552 can be opened and closed independently of each other, for jamming recovery, and maintenance, such as component replacement, cleaning, and adjustment. The opening and closing of the covers 551, 552 are detected by the respective associated cover opening/closing detecting sensors S4, S5, described hereinabove. Further, the covers 551, 552 are provided with respective opening and closing locking mechanisms (shown in FIG. 11). When the cover 552 is opened, a folding processing section 540 can be drawn out of the system, as shown in FIG. 10.

As shown in FIG. 7, the bookbinder 600 is provided with the cover 651 for covering a horizontal bookbinder path section including the horizontal bookbinder conveying path 612, the cover 652 for covering a bookbinding processing section including the bookbinding path 611, and a cover 653 attached to the cover 652. The covers 651 and 652 can be opened and closed independently of each other, for jamming recovery, and maintenance, such as component replacement, cleaning, and adjustment. Further, the cover 653 can be opened and closed independently of the cover 652, for drawing out a sheet bundle discharged onto the bookbinding discharge tray 630 after being subjected to the bookbinding processing. The opening and closing of the covers 651, 652, 653 are detected by the respective associated cover opening/closing detecting sensor S14, S15, S16 described hereinabove. Further, the covers 651, 652 are provided with respective opening and closing locking mechanisms (not shown), described hereinafter.

Figure 8A:
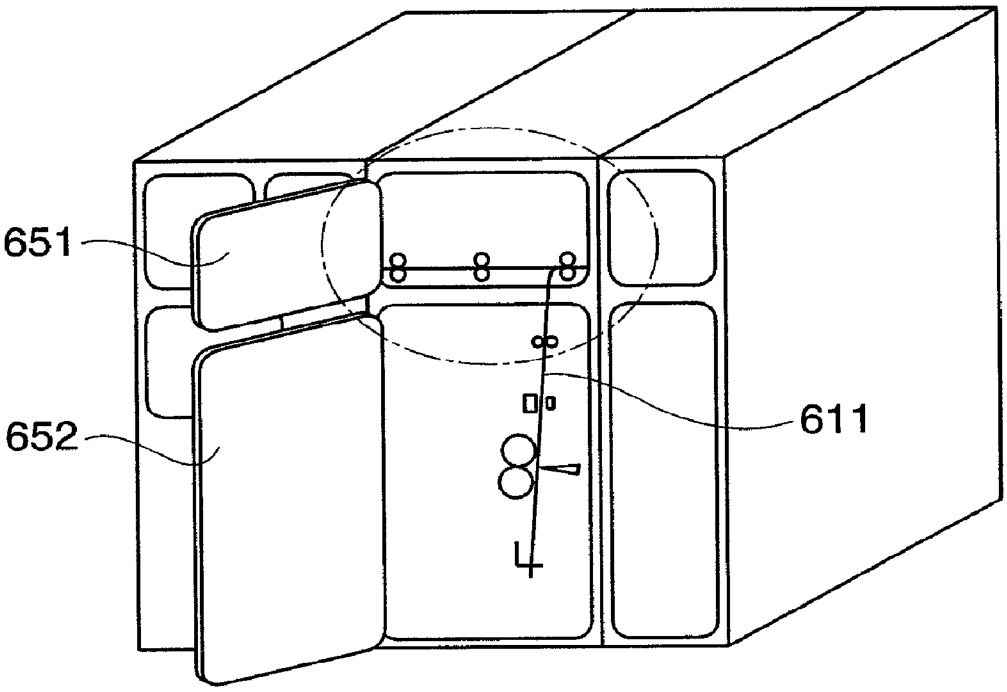
FIG. 8A is a perspective view schematically showing the bookbinder 600 in a state in which a cover thereof is opened.
Figure 8B:
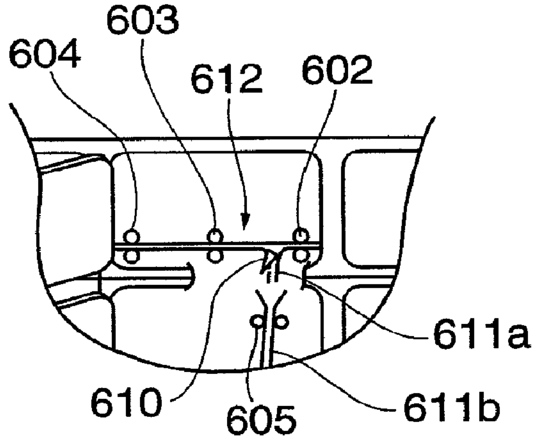
FIG. 8B is an enlarged area of FIG. 8A circle in dashed lines.

When the cover 651 of the bookbinder 600 is opened, as shown in FIGS. 8A and 8B, it is possible to gain access from outside to the horizontal bookbinder conveying path 612, the bookbinding path-selecting flapper 610, and the conveying roller pairs 602, 603, 604. The bookbinding path 611 is divided into an upper part 611*a* provided in the horizontal bookbinding path section and a lower part 611*b* provided in the bookbinding processing section, and it is possible to gain access to the upper part 611*a* of the bookbinding path 611 by opening the cover 651 of the bookbinder 600. Further, when the cover 652 is opened, as shown in FIG. 9, it is possible to draw out a bookbinding processing section 640 which is modularized and includes the lower part 611*b* of the bookbinding path 611, out of the system along slide rails 641. After drawing out the bookbinding processing section 640, it is possible to gain access to the lower part 611*b* of the bookbinding path 611, and the conveying roller pair 605, the stapler 615, and the folding roller pair 620 disposed downstream thereof.

As shown in FIG. 7, the finisher 700 is provided with the cover 751 for covering the finisher path 711, the cover 752 for covering the non-sorting path 712, and the cover 753 for covering a stapling processing section including the stapler 720. The covers 751, 752, 753 can be opened and closed independently of each other, for jamming recovery, and maintenance, such as component replacement, cleaning, and adjustment. The opening and closing of the covers 751, 752, 753 are detected by the respective associated cover opening/closing detecting sensor S24, S25, S26, described hereinabove. Further, the covers 751, 752, 753 are provided with respective opening and closing locking mechanisms (not shown), described hereinafter. When the cover 753 is opened, as shown in FIG. 10, it is possible to draw out a sorting processing section 740.

Figure 23:
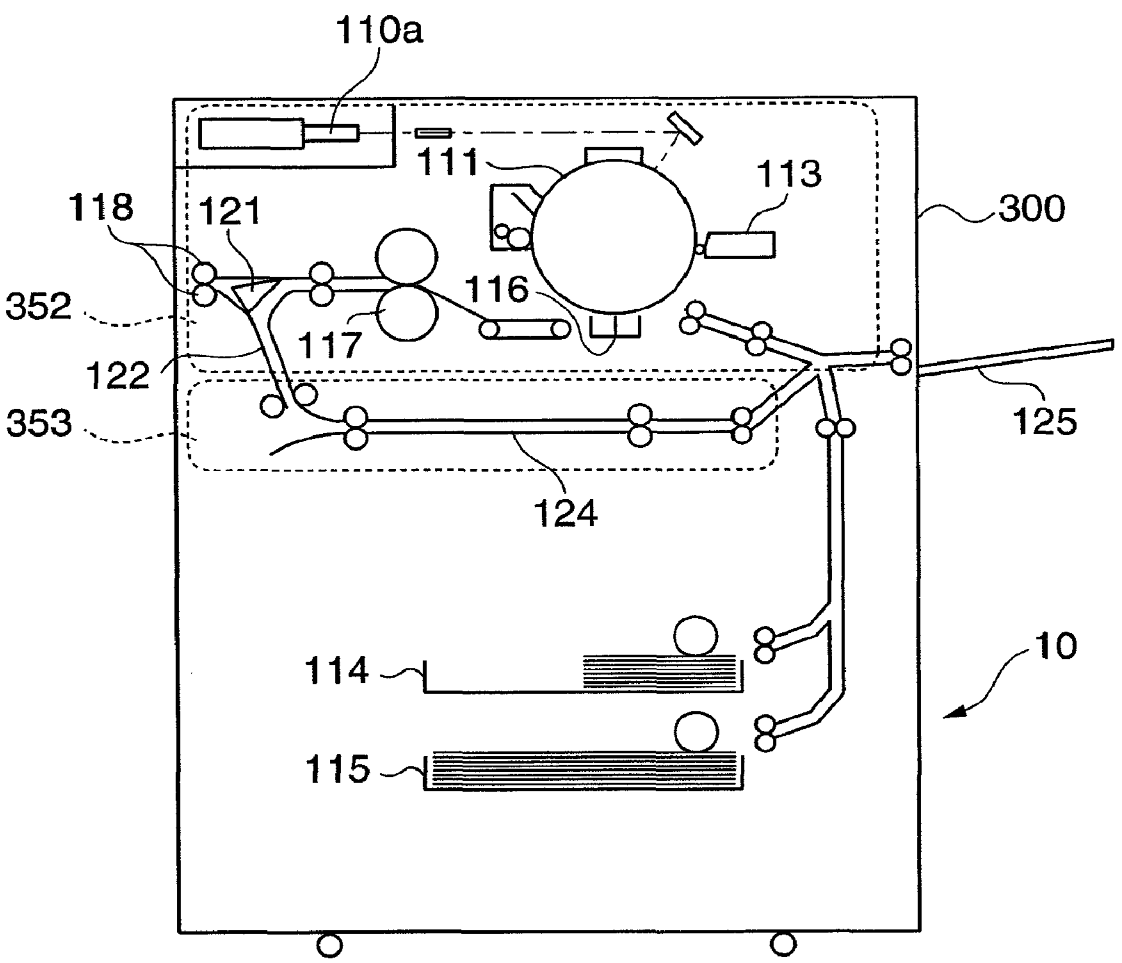
FIG. 23 is a view showing locations of exterior covers provided on a printer 300 of the image forming apparatus 10 shown in FIG. 1.
Figure 24:
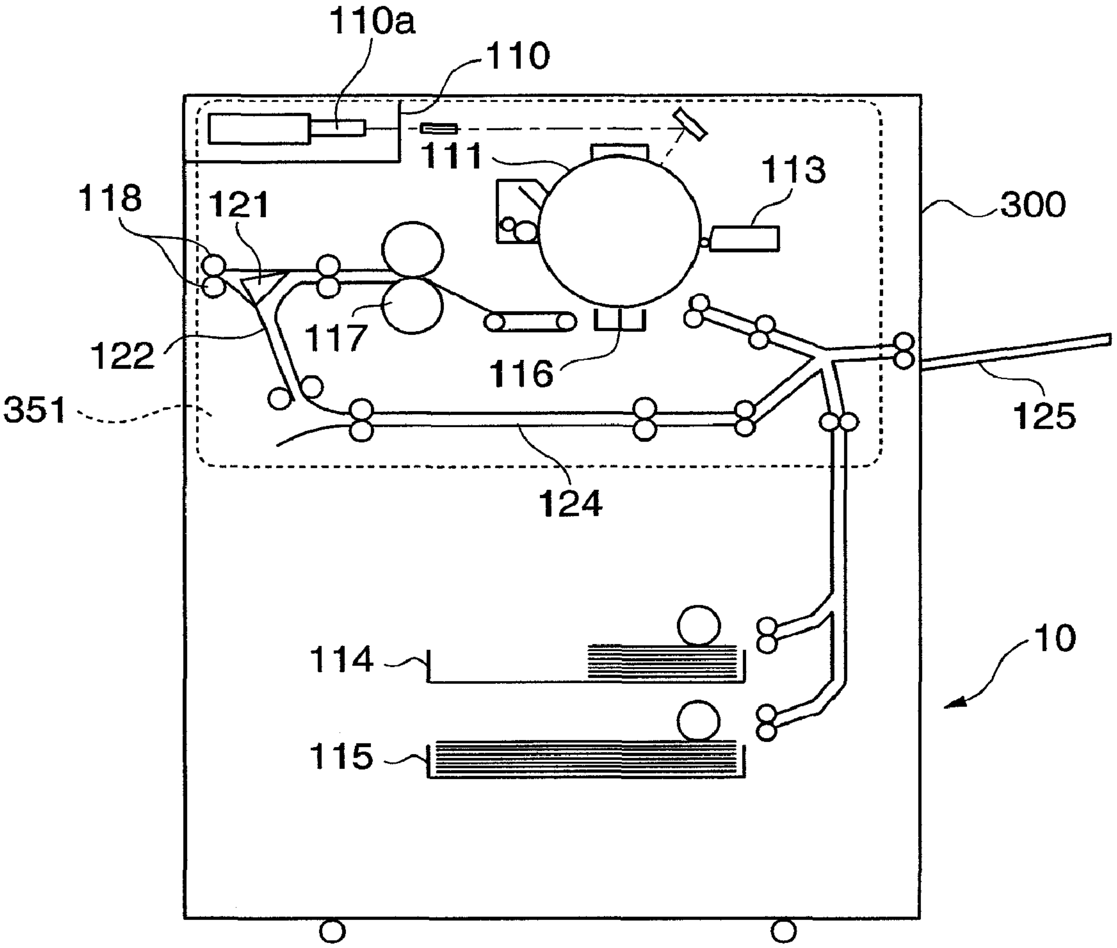
FIG. 24 is a longitudinal cross-sectional view showing the arrangement of essential components of a conventional image forming apparatus.

Next, a description will be given of the locations of exterior covers of the printer 300 of the image forming apparatus main unit 10 with reference to FIG. 23. FIG. 23 is a view schematically showing the locations of the covers provided for the printer 300 of the image forming apparatus main unit 10.

The printer 300 is provided with a cover 352 and a cover 353, as shown in FIG. 23. The cover 352 covers the photosensitive drum 111, the transfer section 116, the fixing section 117, the flapper 121, and conveying paths for guiding sheets to them. In either of cases of single-sided image formation and double-sided image formation, sheets are conveyed via the above-mentioned conveying paths. The cover 353 covers the double-sided conveying path 124. The covers 352, 353 can be opened and closed independently of each other, for jamming recovery, and maintenance, such as component replacement, cleaning, and adjustment. The opening and closing of the covers 352, 353 can be detected by respective associated cover opening/closing detecting sensors, not shown, similarly to the cases of the folder 500, the bookbinder 600, and the finisher 700. Further, the covers 352, 353 are provided with respective opening and closing locking mechanisms (not shown), described hereinafter, similar to those shown in FIGS. 11A and 11B.

When the cover 353 is opened, drivers, not shown, for driving conveying roller pairs disposed in the double-sided conveying path 124 are turned off, to thereby hold the conveying roller pairs in stoppage. When the cover 352 is opened, all driving parts of the printer 300 are stopped, which include driving parts covered by the cover 352, such as the photosensitive drum 111 and the fixing section 117, and driving parts covered by the cover 353. However, even when the cover 353 is opened for maintenance of the double-sided conveying path 124, such as roller cleaning, operation of the image formation is not stopped.

By thus dividing the covers of the system into parts for the respective conveying paths, it is possible to open a cover and carry out maintenance on the associated processing module, even during operation of the image formation, provided that sheets are not being conveyed through a section to which the processing module belongs. This makes it possible to reduce time for stopping the image forming system even when maintenance is carried out on individual modules in various timings.

Figure 11A:
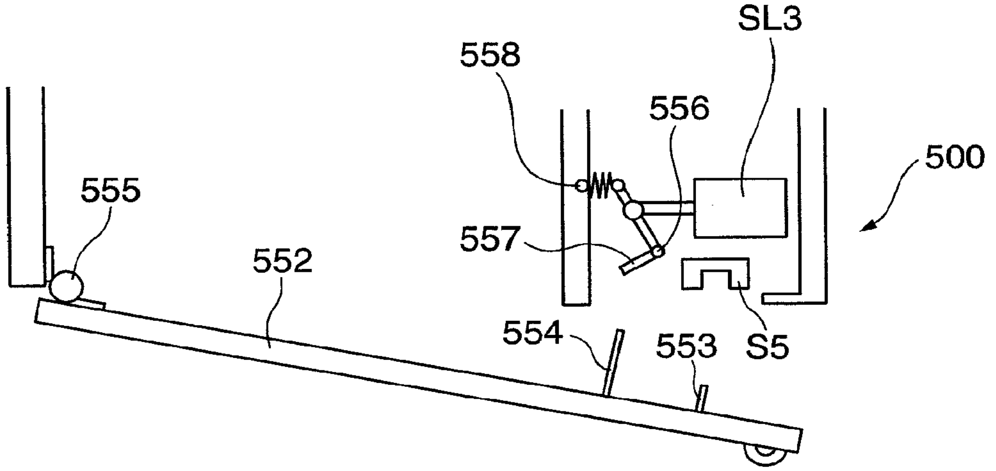
FIG. 11A is a view schematically showing a locking mechanism of the cover 552 of the folder 500 in a cover-unlocked state.
Figure 11B:
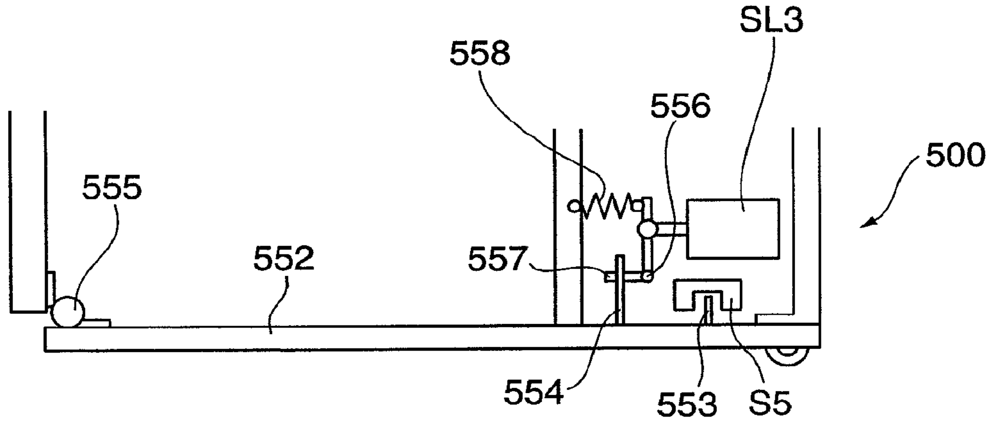
FIG. 11B is a view schematically showing the locking mechanism of the cover 552 of the folder 500 in a cover-locked state.

Next, a description will be given of the respective locking mechanisms for the covers 551, 552, 651, 652, 751, 752, 753 with reference to FIGS. 11A and 11B. FIGS. 11A and 11B are views schematically showing the locking mechanism for the cover 552 of the folder 500. FIG. 11A shows a cover-unlocked state of the locking mechanism, while FIG. 11B shows a cover-locked state of the same. The locking mechanisms for the covers 551, 552, 651, 652, 751, 752, 753 have the same construction, and the cover 552 provided for the folding processing section of the folder 500 will be described here by way of example.

As shown in FIGS. 11A, 11B, the cover 552 of the folder 500 is pivotally supported on a support shaft or the like of the folder 500 using a hinge 555. The cover 552 is provided with an opening/closing detecting sensor flag 553, and depending on the opening and closing of the cover 552, an optical path for the cover opening/closing detecting sensor 553 is opened and blocked by the opening/closing detecting sensor flag 553, whereby the opening and closing of the cover 552 are detected. Further, the cover 552 is provided with a board 554 having a key hole formed therein, for catching a hook 557, referred to hereinafter.

The folding cover lock solenoid SL3 for limiting the opening and closing of the cover 552 is implemented by a solenoid, which has a tip thereof connected to the hook 557. The hook 557 is pivotally supported by a shaft 556 fixed to the folder 500. The hook 557 is pulled by a tension spring 558 in a direction away from the board 554 provided on the cover 552. When the folding cover lock solenoid SL3 operates, the hook 557 pivots in the direction of being inserted into the key hole of the board 554. At this time, if the cover 552 is closed, the hook 557 is caught in the key hole of the board 554, to lock the cover 552 such that the cover 552 cannot be opened. When the folding cover lock solenoid SL3 is turned off, the hook 557 is detached from the key hole by the tension spring 558 to unlock the cover 552.

Next, the arrangement and operation of the operating/display unit 400 and the operating/display unit control section 401 will be described with reference to FIGS. 12 to 14. FIG.

Figure 13:
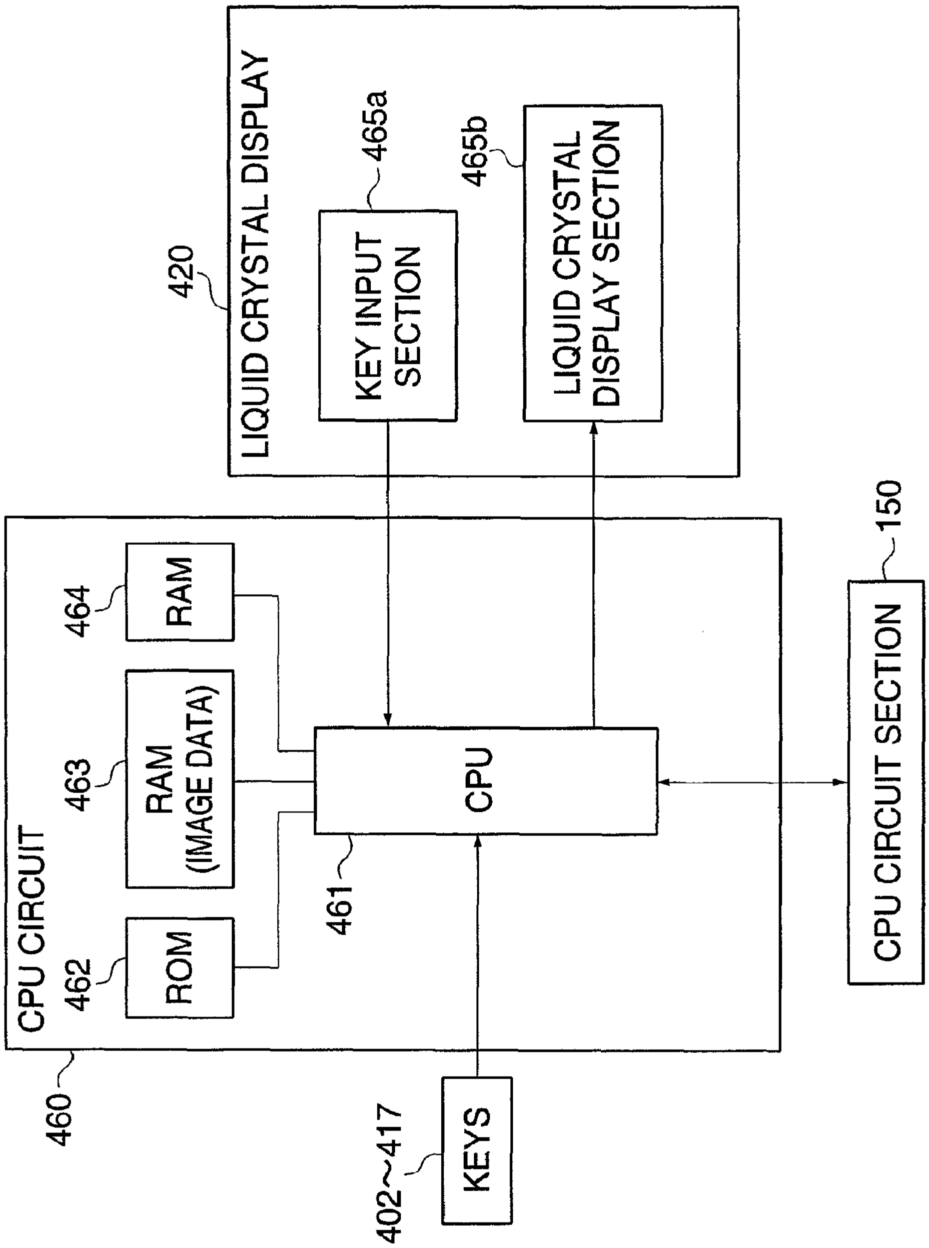
FIG. 13 is a block diagram showing the arrangement of an operating/display unit control section 401 appearing in FIG. 2.
Figure 14A:
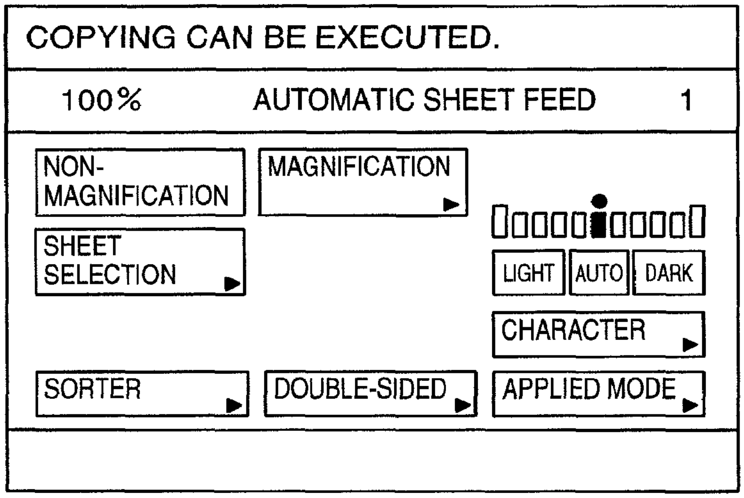
FIG. 14A is a view showing an example of a main menu screen displayed on the operating/display unit 400.
Figure 14B:
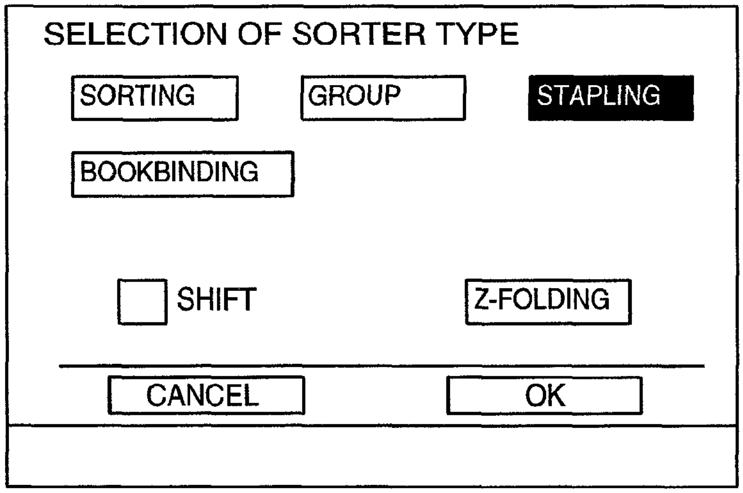
FIG. 14B is a view showing an example of a menu option-selecting screen displayed on the operating/display unit 400.
Figure 14C:
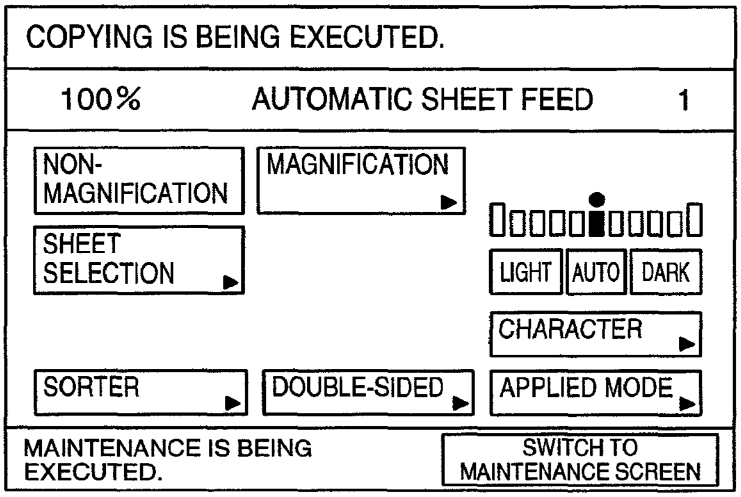
FIG. 14C is a view showing an example of the main menu screen displayed during execution of maintenance work.

12 is a view schematically showing the appearance of the operating/display unit 400 appearing in FIG. 1, and FIG. 13 is a block diagram showing the arrangement of the operating/display unit control section 401 appearing in FIG. 2. FIG. 14A is a view showing an example of a main screen displayed on the operating/display unit 400, and FIG. 14B is a view showing an example of a menu option-selecting screen displayed on the operating/display unit 400. Further, FIG. 14C is a view showing an example of the main screen displayed during execution of a maintenance operation.

Figure 12:
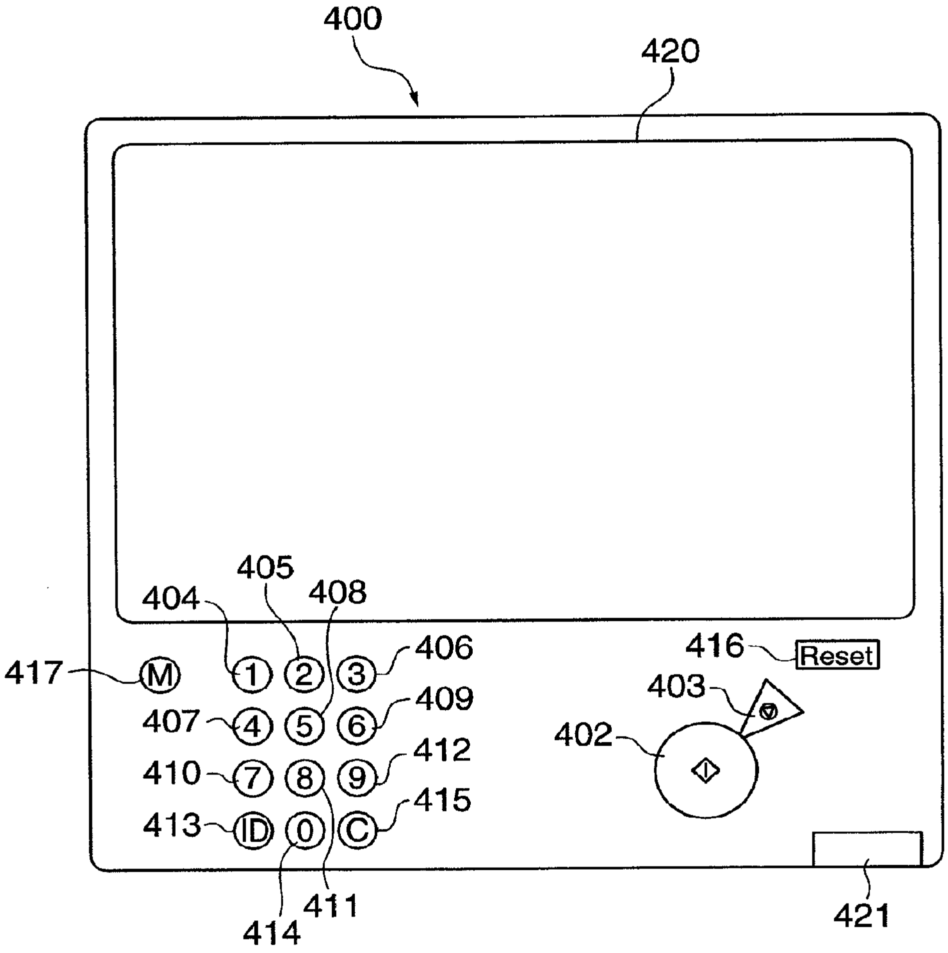
FIG. 12 is a view showing the appearance of an operating/display unit 400 appearing in FIG. 1.

As shown in FIG. 12, on the operating/display unit 400, there are arranged a start key 402 for starting image forming operation, a stop key 403 for interrupting the image forming operation, ten keys 404 to 412 and 414 for setting numerical values, an ID key 413, a clear key 415, a reset key 416, and a maintenance key 417, as well as an alarm buzzer 421 such as a beeper. Further, on an upper part of the operating/display unit 400, there is disposed a liquid crystal display 420 having a touch panel formed thereon. Soft keys can be formed on the screen of the liquid crystal display 420.

As shown in FIG. 13, the operating/display unit control section 401 includes a CPU circuit 460 comprised of a CPU 461, a ROM 462, RAM's 463 and 464. The RAM 463 stores various data of screens to be displayed on the liquid crystal display 420. The RAM 464 is used e.g. as a work area for the CPU 461. The liquid crystal display 420 is comprised of a key input section 465*a* for key entry via soft keys on the touch panel, and a liquid crystal display section 465*b*.

The CPU circuit 460 communicates with the CPU circuit section 150 provided in the image forming apparatus main unit 10 for data exchange, and executes programs stored in the ROM 462, in response to instructions from the CPU circuit section 150 and inputs via the keys 402 to 416 and 465*a*, and outputs screen data stored in the RAM 463 to the liquid crystal display section 465*b*, for screen display.

The present image forming system has the non-sorting mode (group mode), the sorting mode, a stapling sorting mode (binding mode), the bookbinding mode, and so forth, as the post-processing modes. These modes are set or configured by input operations from the operating display section 400. When the sorting mode is to be set as a post-processing mode, for example, a soft key "Sorter" is selected on the main screen shown in FIG. 14A. In response to the selection of the "Sorter", a sorter type-selecting screen (example of the menu option-selecting screen) shown in FIG. 14B is displayed on the liquid crystal display 420, and a processing mode (post-processing mode) is set via this sorter type-selecting screen.

Further, when the display screen returns to the main screen during execution of maintenance described in detail hereinbelow, the main screen is displayed with a message "Maintenance is being executed".

Next, the maintenance for the image forming system will be described in detail with reference to FIGS. 15A to 18B. FIGS. 15A to 15D and FIGS. 16A to 16D show examples of operating screen displayed during maintenance operation. FIG. 17 is a view showing an example of a screen displayed for showing modules of the system on which maintenance can be performed, when both a single-sided image forming mode and the sorting mode are selected as processing modes, and FIGS. 18A and 18B are views showing a table of maintenance items and sub-maintenance items associated therewith.

In the present embodiment, the table showing the plurality of maintenance items and the plurality of sub-maintenance items associated therewith is stored, and when a maintenance operation (hereinafter referred to simply as "maintenance") based on a maintenance item selected from the plurality of maintenance items is completed, it is determined whether or not there is any sub-maintenance item associated with the selected maintenance item. If there is such a sub-maintenance item, the sub-maintenance item is displayed on the liquid crystal display 420.

First, a description will be given of the maintenance items and the sub-maintenance items. The table listing the plurality of maintenance items and the sub-maintenance items associated therewith, as shown in FIGS. 18A and 18B, is stored in the ROM 151 (or the RAM 152) of the CPU circuit section 150. Although this table lists only the maintenance items concerning the folder 500 and the sub-maintenance items associated therewith, there are also tables provided for other apparatuses (the bookbinder 600, the finisher 700, etc.), which have the same structure and are stored in the ROM 151 (or the RAM 152).

In the present embodiment, the sub-maintenance item is defined, in relation to a certain maintenance item, as an item based on which maintenance should be necessarily carried out after completion of the maintenance item. The number of sub-maintenance items associated with one maintenance item is not limited, and it may be zero, one, or more. Further, one or more sub-maintenance items may be provided as items subordinate to a sub-maintenance item.

When the folding roller 521 of the folder 500 is replaced by a new one, for example, it is necessary to carry out folding roller pressure contact force adjustment, first folding position adjustment, and second folding position adjustment, as sub-maintenance as shown in the table in FIGS. 18A and 18B. The folding roller pressure contact force adjustment and the first folding position adjustment are not restricted in the order of execution thereof, but the second folding position adjustment always has to be performed after the first folding position adjustment. Therefore, in this example, as to the order of execution of maintenance based on these sub-maintenance items, the folding roller pressure contact force adjustment, the first folding position adjustment and the second folding position adjustment are carried out in the mentioned order.

When maintenance is to be performed, first, the maintenance key 417 (appearing in FIG. 12) of the operating/display unit 400 is depressed by the user. When the maintenance key 417 is depressed, the operating/display unit control section 401 displays on the liquid crystal display 420 a module state screen indicating ones of the processing modules (the image forming apparatus main unit 10, the folder 500, the bookbinder 600, the finisher 700), for which maintenance can be performed, as shown in FIG. 17. The module state screen in FIG. 17 shows whether or not maintenance can be performed, i.e. whether or not a cover covering each module can be opened. Covers which are allowed to be opened are highlighted, whereas covers which are not allowed to be opened are shaded in gray.

More specifically, when maintenance is to be performed on the folder 500 during execution of sorting processing in the single-sided image forming mode, in the printer 300, the cover 353 covering the double-sided processing module section where no sheet is conveyed in the single-sided image forming mode is highlighted, and the cover 352 covering the image forming section is shaded in gray. In the folder 500 and the bookbinder 600, the covers 551, 652 covering the horizontal folder conveying path 502 and the horizontal bookbinder conveying path 612 via which each sheet having an image formed thereon is conveyed to the finisher 700 are shaded in gray, and the cover 552 covering the folding processing section 540 and the cover 652 covering the bookbinding processing section 640 are highlighted. In the finisher 700, sheets are conveyed from the finisher path 711 through the sorting path 713 to be discharged onto the intermediate tray 730 and then onto the stack tray 722, and therefore the covers 751, 753 are shaded in gray, and the cover 752 highlighted.

Figure 15A:
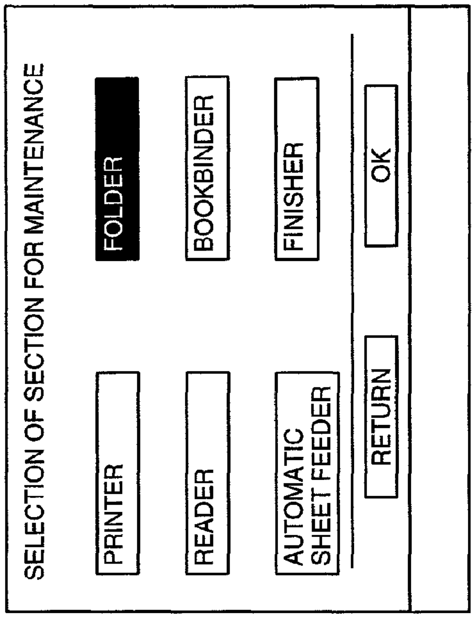
FIG. 15A is a view showing an example of a maintenance module-selecting screen displayed on the operating/display unit 400.
Figure 15B:
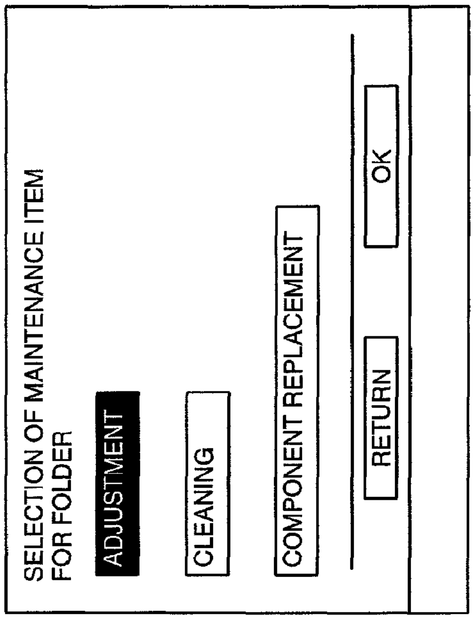
FIG. 15B is a view showing an example of a maintenance item-selecting screen displayed on the operating/display unit 400.
Figure 15C:
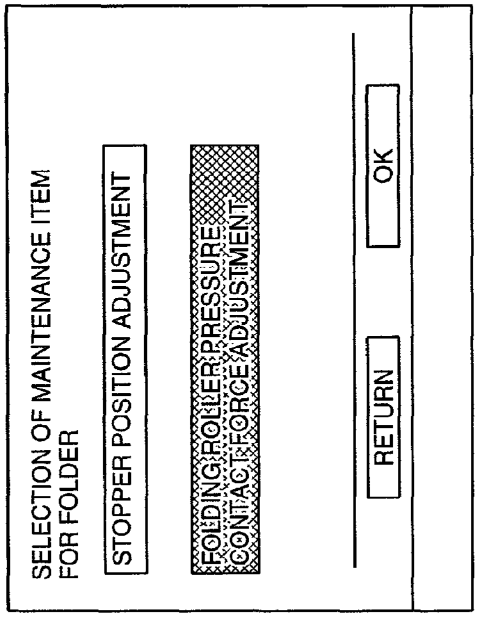
FIG. 15C is a view showing an example of a detailed maintenance item-selecting screen displayed on the operating/display unit 400.
Figure 15D:
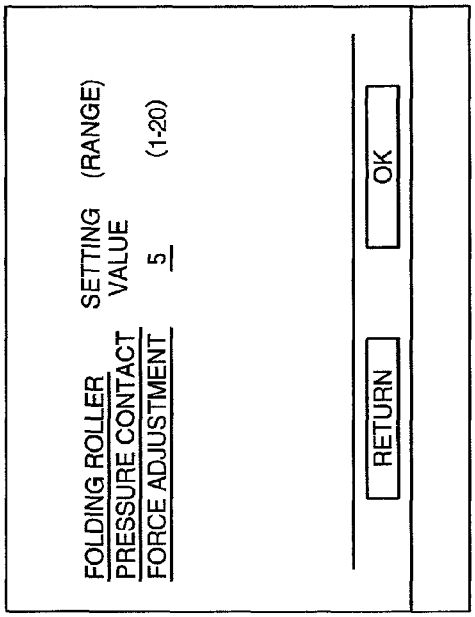
FIG. 15D is a view showing an example of a screen for configuring and performing a maintenance operation based on the selected detail maintenance item, which is displayed on the operating/display unit 400.
Figure 16A:
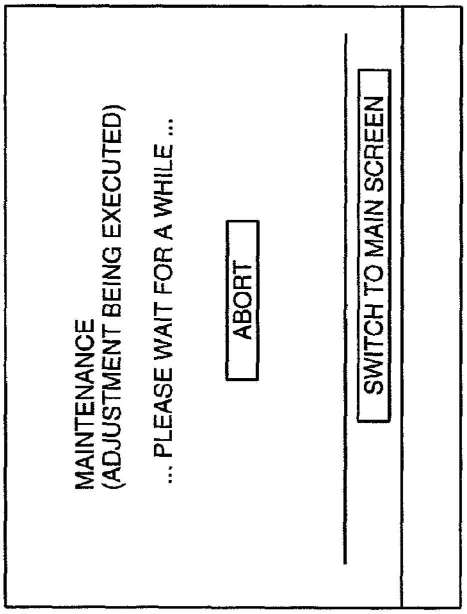
FIG. 16A is a view showing an example of an in-maintenance screen displayed on the operating/display unit 400 during execution of maintenance for adjustment.

After checking on modules on which maintenance can be performed, on the module state screen shown in FIG. 17, if the user depresses a soft key "OK" on this screen displayed on the liquid crystal display 420, a maintenance module-selecting screen shown in FIG. 15A is displayed. On the maintenance module-selecting screen, all modules requiring maintenance are displayed as menu options. When the user selects a module for maintenance from the selectable modules ("Folder" is selected in the illustrated example) by depressing a portion corresponding to the selected module on the selection screen, a menu of maintenance items associated with the module selected by the user (maintenance item-selecting screen) is displayed (FIG. 15B). When the user selects a maintenance item ("Adjustment" is selected in the illustrated example) by depressing a portion corresponding to the selected item on the selection screen in FIG. 15B, the details of the maintenance item selected by the user are displayed (FIG. 15C). When the user selects a maintenance item ("Folding Roller Pressure Contact Force Adjustment" is selected in the illustrated example) by depressing a portion corresponding to the selected item on the selection screen in FIG. 15C, a screen for configuring and performing maintenance based on the maintenance item selected by the user is displayed (FIG. 15D). When the user enters setting values on the screen in FIG. 15D, and then depresses an "OK" key, the desired maintenance is carried out, and at the same time an in-maintenance screen is displayed (FIG. 16A). In the illustrated example, the pressure contact force of the folding roller 521 is automatically adjusted.

On the other hand, in the case of a type of maintenance whose completion is determined by the user, such as cleaning, component replacement, or an item necessitating manual adjustment, after "Cleaning" or "Component Replacement" is selected on the screen in FIG. 15B, for example, the in-maintenance screen (FIG. 16B) is displayed (in the illustrated embodiment, "Component Replacement" is selected). After completion of the maintenance, when the user depresses a "Completion" key on the in-maintenance screen in FIG. 16B, it is determined that the maintenance has been completed.

Figure 16B:
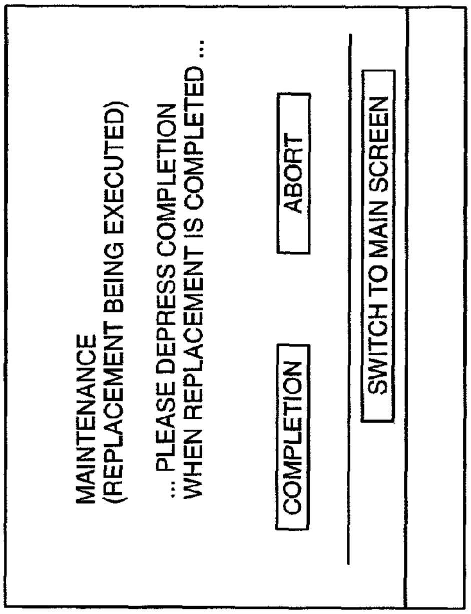
FIG. 16B is a view showing an example of an in-maintenance screen displayed on the operating/display unit 400 during execution of maintenance for component replacement.
Figure 16C:
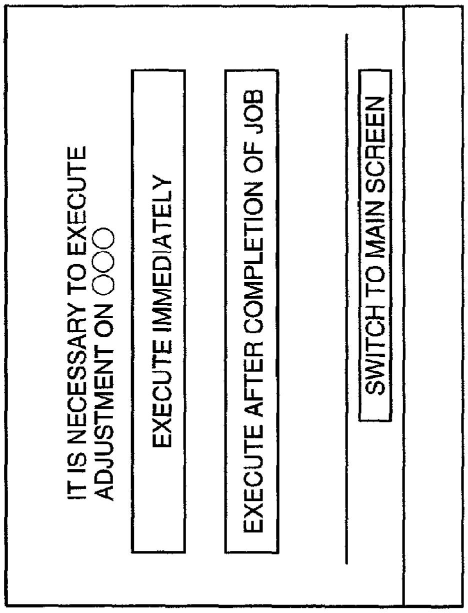
FIG. 16C is a view showing an example of a sub-maintenance execution selection screen displayed on the operating/display unit 400.
Figure 16D:
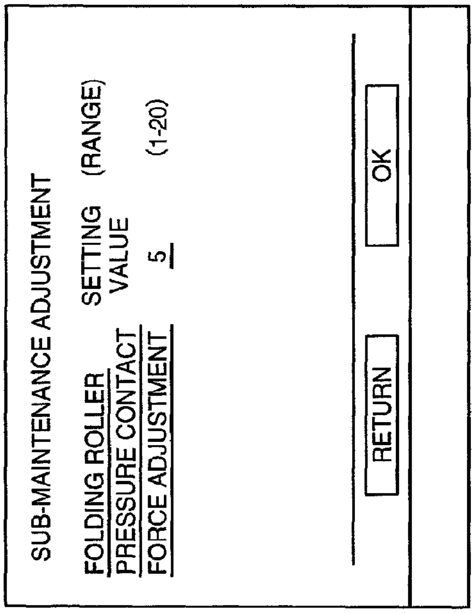
FIG. 16D is a view showing an example of a screen for configuring and performing a maintenance operation based on the selected sub-maintenance item, which is displayed on the operating/display unit 400.
Figure 17:
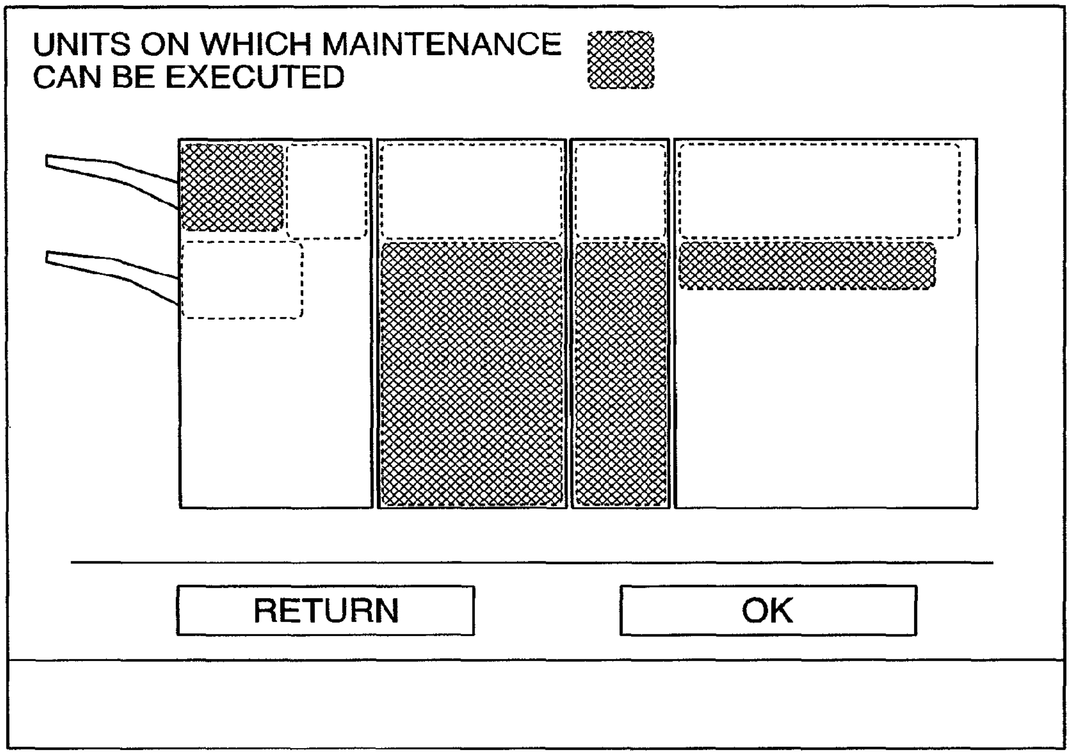
FIG. 17 is a view showing an example of a screen displayed for showing modules of the system on which maintenance can be performed, when both a single-sided image forming mode and sorting processing are selected as processing modes.

When the maintenance is completed, or when the user depresses the "Completion" key on the in-maintenance screen in FIG. 16B upon the completion of maintenance, it is determined, by referring to the above described table, whether or not there is a sub-maintenance item associated with the maintenance item based on which maintenance has been completed. If such a sub-maintenance item exists, a sub-maintenance execution selection screen is displayed (FIG. 16C). This sub-maintenance execution selection screen allows the user to select whether or not maintenance based on the sub-maintenance item should be performed immediately or after completion of a job being executed. When an "Execute immediately" key is depressed on the sub-maintenance execution selection screen, a screen for configuring and performing maintenance based on the sub-maintenance item is displayed (FIG. 16D). In the illustrated example, the folding roller pressure contact force adjustment is performed which is a sub-maintenance item based on which maintenance should be necessarily carried out after replacement of the folding roller 512, as shown in the table in FIGS. 18A and 18B. Then, after entering setting values, if an "OK" key is depressed on the screen in FIG. 16D, the pressure contact force of the folding roller 521 is automatically adjusted.

On the other hand, when an "Execute after completion of the job" key is selected on the sub-maintenance execution selection screen, the screen for configuring and performing the maintenance based on the sub-maintenance item is displayed (FIG. 16D) after completion of the job, similarly to the case where the "Execute immediately" key is depressed.

Next, an operating screen display process in the maintenance mode will be described with reference to FIGS. 19 to 21B. FIGS. 19 to 21B are flowcharts showing a procedure of operations executed in the operating screen display process during maintenance. The procedure shown by the flowcharts in FIGS. 19 to 21B is executed by the CPU 461, based on a program stored in the ROM 462 of the operating/display unit control section 401.

Figure 19:
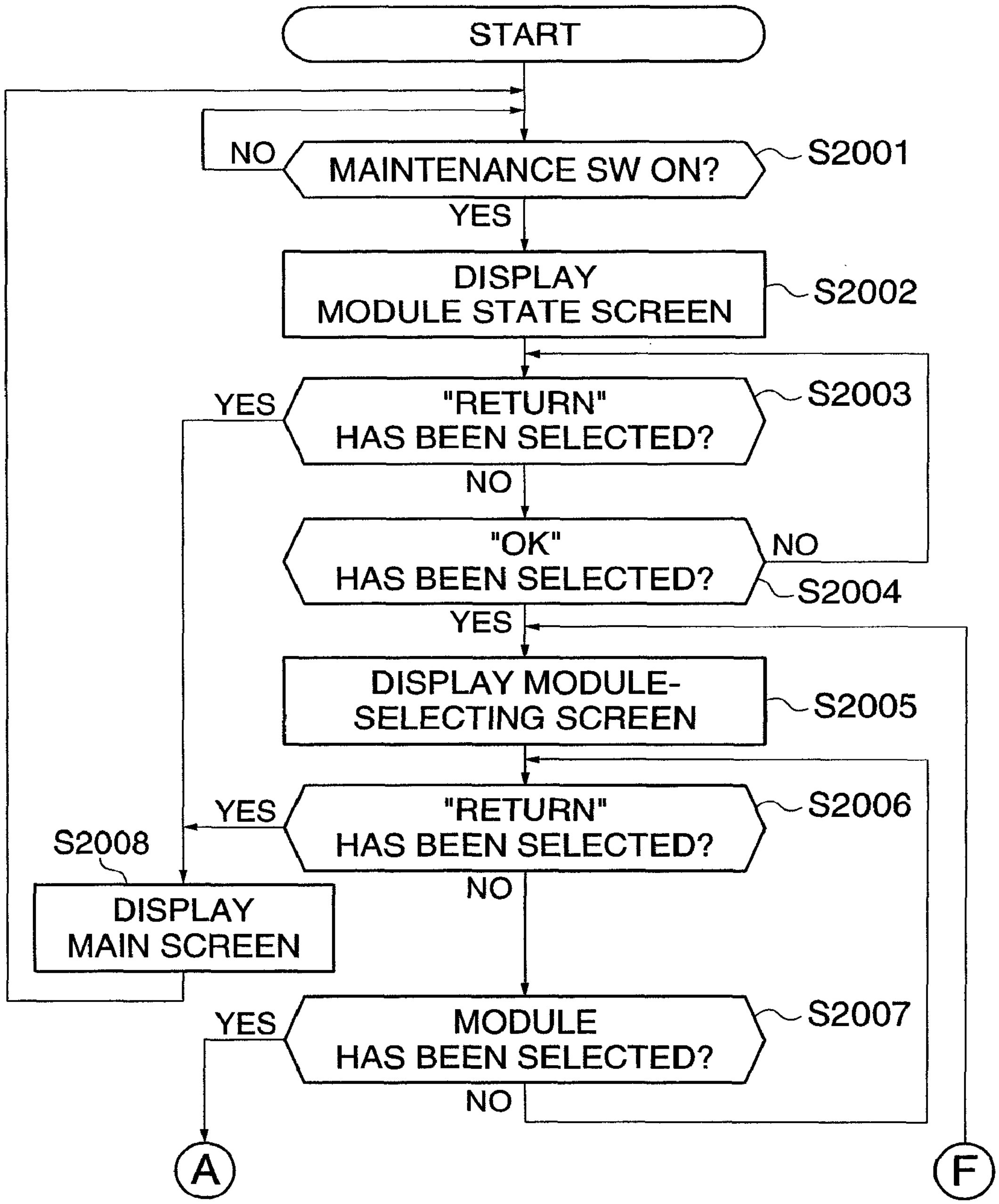
FIG. 19 is a flowchart showing a procedure of operations executed for an operating screen display process, during maintenance.
Figure 20A:
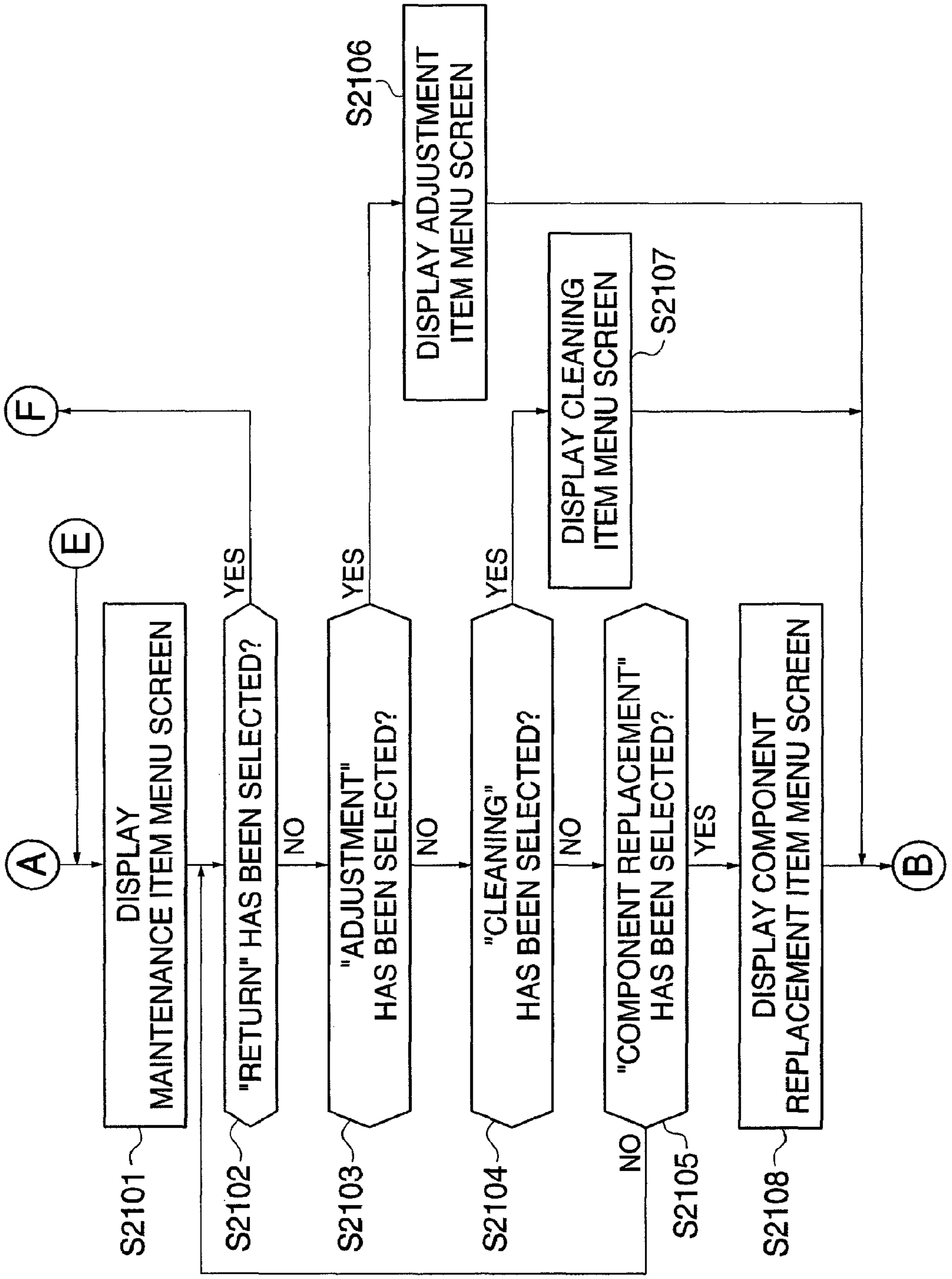
FIGS. 20A and 20B are continued parts of the flowchart shown in FIG. 19.
Figure 20B:
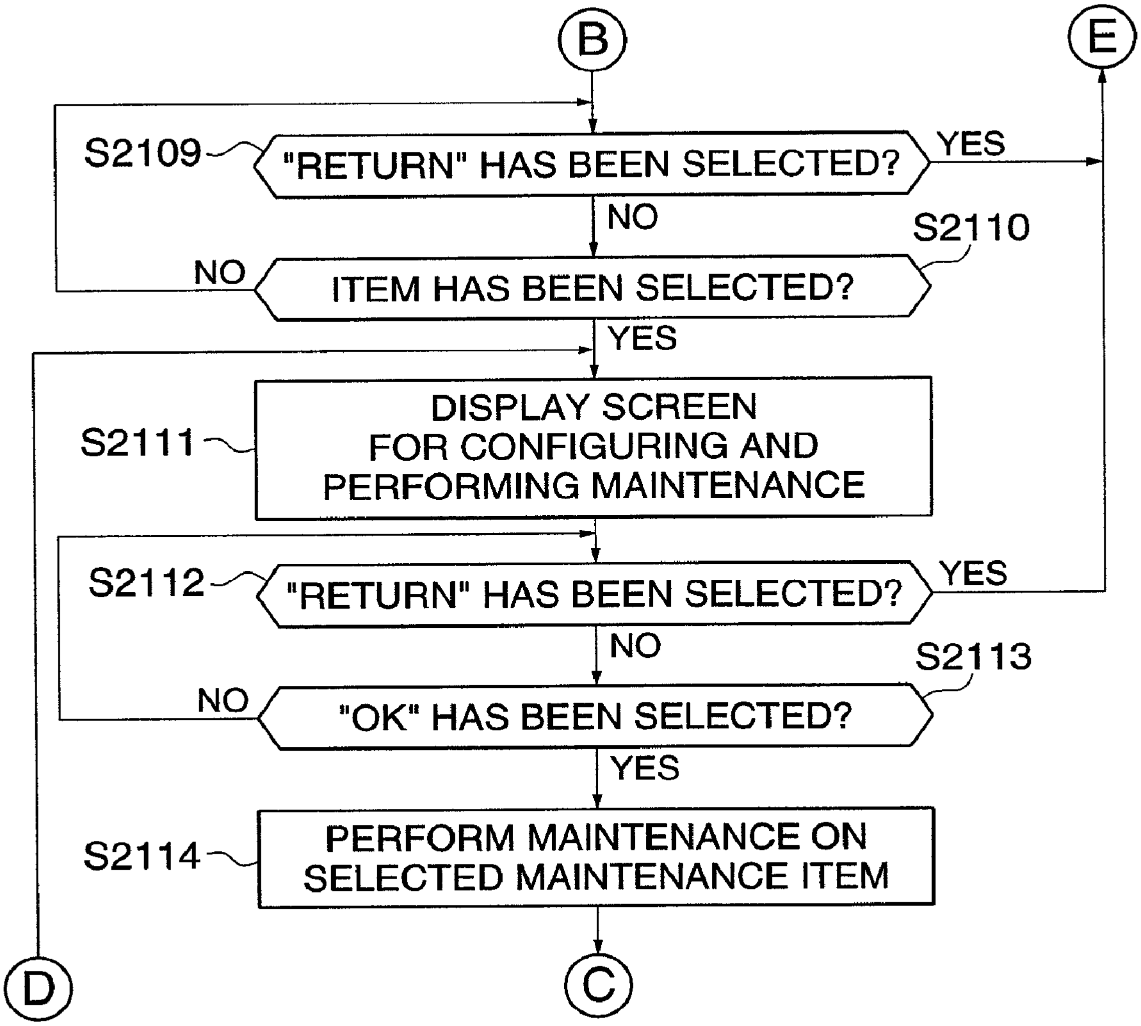
Figure 21A:
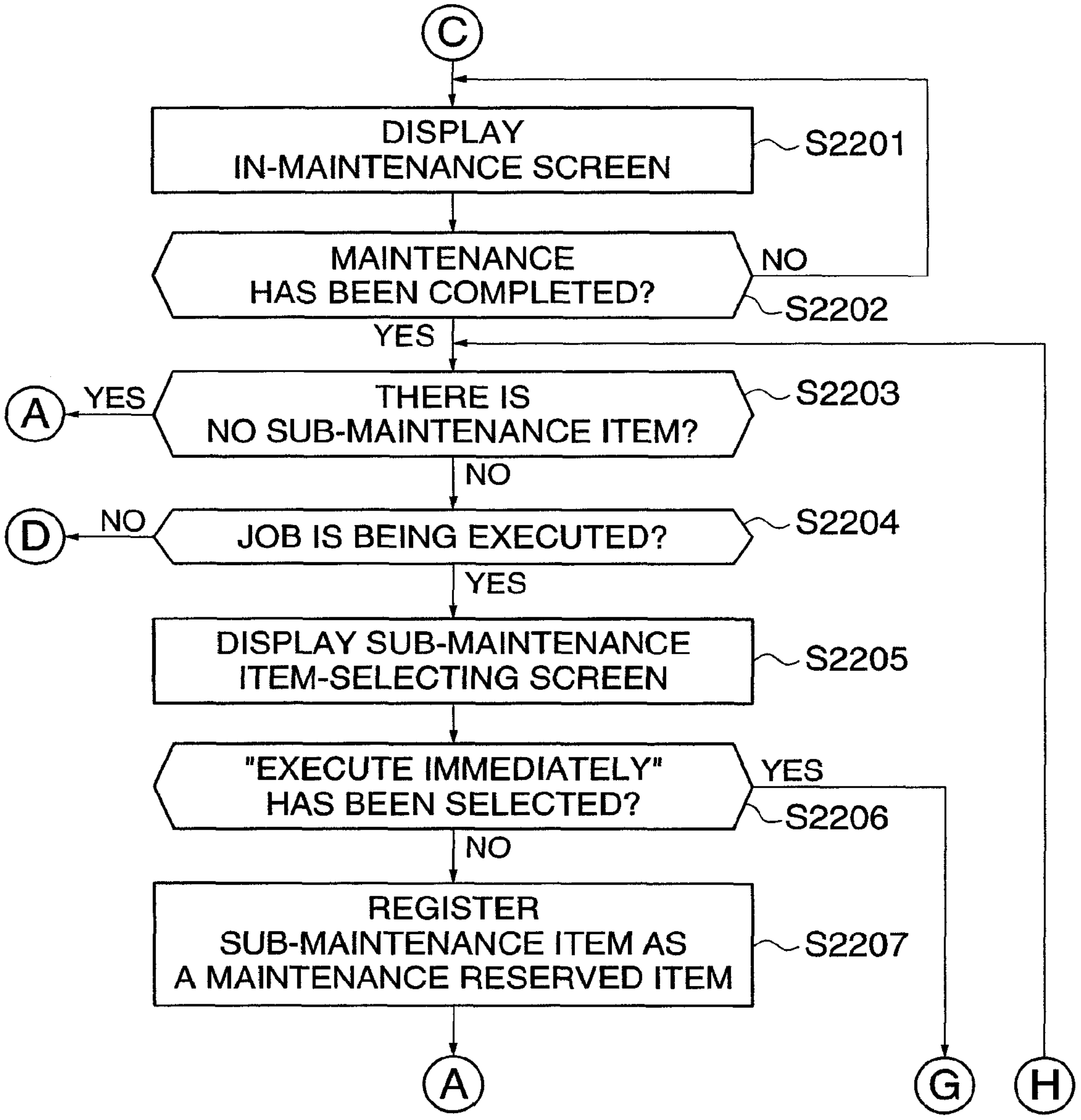
FIGS. 21A and 21B are continued parts of the flowchart shown in FIG. 19.
Figure 21B:
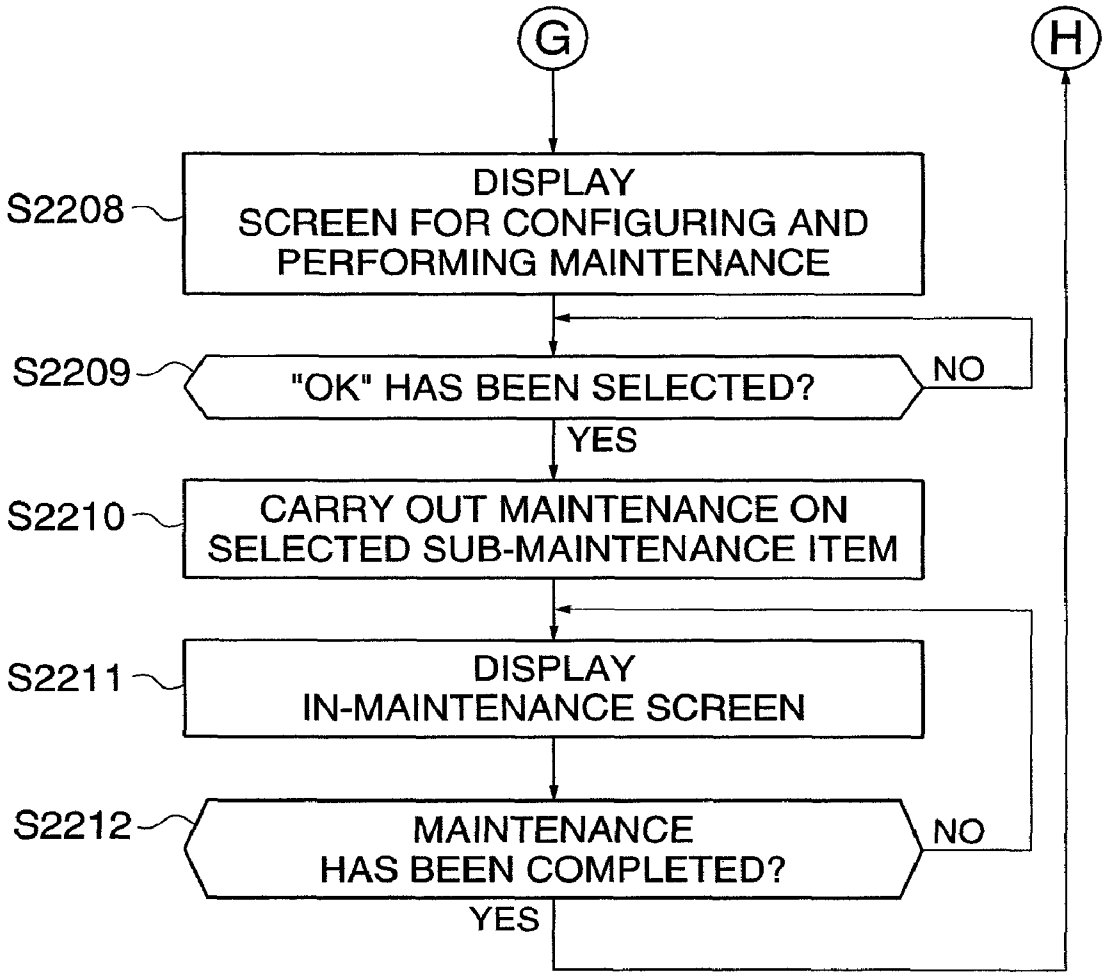

As shown in FIG. 19, in a step S2001, the CPU 461 monitors depression of the maintenance key 417 of the operating/display unit 400 by the user. If it is determined that the maintenance key 417 has been depressed, the module state screen (shown in FIG. 17) is displayed in a step S2002 so as to present modules on which maintenance can be performed, to the user. Then, in a step S2003, the CPU 461 determines whether or not "Return" has been selected on the module state screen. If "Return" has been selected, the main screen is displayed in a step S2008. Here, when a job is being executed, the main screen as shown in FIG. 14C is displayed, whereas when no job is being executed, the main screen as shown in FIG. 14A is displayed. On the other hand, if "Return" has not been selected, the CPU 461 determines in a step S2004 whether or not "OK" has been selected. If "OK" has not been selected, the CPU 461 returns to the step S2003, whereas if "OK" has been selected, the CPU 461 proceeds to a step S2005, wherein the maintenance module-selecting screen (FIG. 15A) for selecting a module for maintenance is displayed.

Then, the CPU 461 determines in a step S2006 whether or not "Return" has been selected. If "Return" has been selected, the main screen is displayed in the step S2008. On the other hand, if "Return" has not been selected, the CPU 461 determines in a step S2007 whether or not a module has been selected by the user on the maintenance module-selecting screen. If a module has not been selected, the CPU 461 returns to the step S2006, whereas if a module has been selected, the CPU 461 proceeds to a step S2101 in FIG. 20A.

In the step S2101, the CPU 461 displays a maintenance item menu (FIG. 15B) for the module selected in the step S2007. Then, the CPU 461 determines in a step S2102 whether or not "Return" has been selected. If "Return" has been selected, the CPU 461 returns to the step S2005, whereas if "Return" has not been selected, the CPU 461 determines in a step S2103 whether or not "Adjustment" has been selected for display of a menu of maintenance items for adjustment.

When "Adjustment" has not been selected in the step S2103, the CPU 461 determines in a step S2104 whether or not "Cleaning" has been selected for display of a menu of maintenance items for cleaning. If "Cleaning" has not been selected, the CPU 461 determines in a step S2105 whether or not "Component Replacement" has been selected for display of a menu of maintenance items for component replacement. If "Component Replacement" has not been selected, the CPU 461 returns to the step S2102.

If "Adjustment" has been selected in the step S2103, the CPU 461 proceeds to a step S2106, wherein the CPU 461 displays the menu (FIG. 15C) for adjustment maintenance on the module selected by the user, followed by proceeding to a step S2109.

If "Cleaning" has been selected in the step S2104, the CPU 461 proceeds to a step S2107, wherein the CPU 461 displays the menu (not shown) for cleaning maintenance on the module selected by the user, followed by proceeding to the step S2109.

If "Component Replacement" has been selected in the step S2105, in a step S2108, the CPU 461 displays a menu (not shown) for component replacement maintenance on the module selected by the user, followed by proceeding to the step S2109.

In the step S2109, the CPU 461 determines whether or not "Return" has been selected by the user. If "Return" has been selected by the user, the CPU 461 returns to the step S2101. On the other hand, if "Return" has not been selected by the user, the CPU 461 determines in a step S2110 whether or not an item has been selected on the maintenance item menu screen. If no item has been selected, the CPU 461 returns to the step S2109.

If an item has been selected in the step S2110, the CPU 461 displays the screen for configuring and performing maintenance (FIG. 15D) in a step S2111. Then, the CPU 461 determines in a step S2112 whether or not "Return" has been selected by the user. If "Return" has been selected by the user, the CPU 461 returns to the step S2101. On the other hand, if "Return" has not been selected by the user, the CPU 461 determines in a step S2113 whether or not "OK" has been selected by the user. If "OK" has not been selected, the CPU 461 returns to the step S2112, whereas if "OK" has been selected, the CPU 461 configures and performs maintenance based on the selected maintenance item in a step S2114. Then, the CPU 461 proceeds to a step S2201 in FIG. 21A.

In the step S2201, the CPU 461 displays an in-Bmaintenance screen (FIG. 16A or 16B) of the maintenance selected by the user. The in-maintenance screen displayed here varies depending on the type of a maintenance item selected by the user in the step S2110. More specifically, if the selected maintenance item is a type in which completion of maintenance can be determined by the CPU 461 without a key input operation by the user, the screen as shown in FIG. 16A is displayed. On the other hand, if the selected maintenance item is a type in which completion of maintenance is determined by the CPU 461 based on an input operation using the "Completion" key by the user, the screen as shown in FIG. 16B is displayed.

Then, in a step S2202, the CPU 461 determines whether or not the maintenance has been completed. When the screen shown in FIG. 16B is displayed in the step S2201, i.e. when the selected maintenance item is a type in which completion of maintenance is determined by the CPU 461 based on the input operation using the "Completion" key by the user, the CPU 461 determines, upon depression of the "Completion" key by the user on the screen in FIG. 16B, that the maintenance has been completed. If it is determined that the maintenance has not been completed, the CPU 461 returns to the step S2201.

If it is determined in the step S2202 that the maintenance has been completed, the CPU 461 determines in a step S2203 whether or not there is a sub-maintenance item associated with the maintenance item based on which maintenance has been completed. If there is no sub-maintenance item, the CPU 461 returns to the step S2101. On the other hand, if there is a sub-maintenance item, the CPU 461 proceeds to a step S2204, wherein it is determined whether or not a job is being executed. If no job is being executed, the CPU 461 returns to the step S2111.

If it is determined that a job is being executed in the step S2204, the CPU 461 proceeds to a step S2205, wherein the sub-maintenance execution selection screen (FIG. 16C) for selecting timing for performing maintenance based on the sub-maintenance item is displayed. Then, the CPU 461 determines in a step S2206 whether or not "Execute immediately" has been selected on the selection screen. If "Execute immediately" has not been selected, i.e. if "Execute after completion of the job" has been selected, the CPU registers the sub-maintenance item as a maintenance reserved item in a step S2207, followed by returning to the step S2101.

If "Execute immediately" has been selected in the step S2206, the CPU 461 displays the screen for configuring and performing maintenance (FIG. 16D) for the sub-maintenance item (S2208). Then, in a step S2209, the CPU 461 awaits selection of "OK", i.e. input for configuration of maintenance and instruction of execution of maintenance are made on the screen. When "OK" has been selected, the CPU 461 configures and carries out maintenance based on the sub-maintenance item in a step S2210. Then, in a step 2211, the CPU 461 displays the in-maintenance screen (FIG. 16A or 16B) of the sub-maintenance. An in-maintenance screen displayed here varies depending on the type of the selected sub-maintenance item. More specifically, if the selected sub-maintenance item is a type in which completion of maintenance can be determined by the CPU 461, the screen shown in FIG. 16A is displayed, whereas if the selected sub-maintenance item is a type in which completion of maintenance cannot be determined by the CPU 461, the screen shown in FIG. 16B is displayed.

Then, the CPU 461 determines in a step S2212 whether or not the maintenance has been completed. When the screen shown in FIG. 16B is displayed in the step S2211, i.e. when the selected sub-maintenance item is a type in which completion of maintenance is determined by the CPU 461 based on an input operation using the "Completion" key by the user, the CPU 461 determines, upon depression of the "Completion" key by the user on the screen in FIG. 16B, that the maintenance has been completed. If it is determined that the maintenance has not been completed, the CPU 461 returns to the step S2211. On the other hand, if it is determined that the maintenance has been completed, the CPU 461 returns to the step S2203, wherein it is determined whether or not there remains any maintenance item based on which maintenance should be carried out next.

Figure 22:
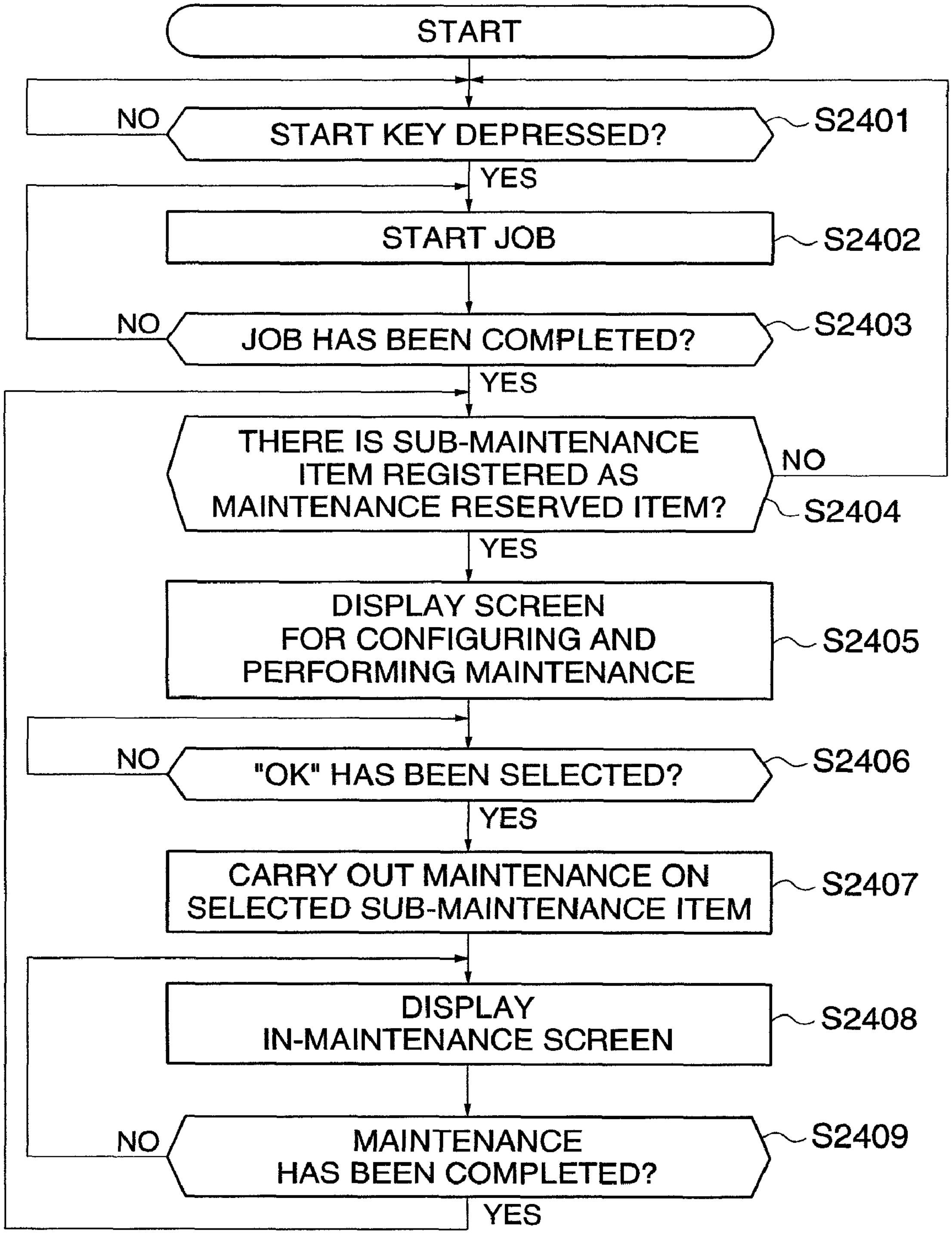
FIG. 22 is a flowchart showing a procedure of operations executed when a sub-maintenance item is registered as a maintenance reserved item.

Next, a process executed when there is a sub-maintenance item registered as a maintenance reserved item for maintenance to be performed after termination of a job will be described with reference to FIG. 22. FIG. 22 is a flowchart showing a procedure of operations of executing this process.

As shown in FIG. 22, in a step S2401, the CPU 461 awaits depression of the start key 402 of the operating/display unit 400 by the user. Then, when it is determined that the start key 402 has been depressed, the CPU 461 starts a job in a set processing mode, in a step S2402. Further, the CPU 461 determines in a step S2403 whether or not the job has been completed. If the job has not been completed, the CPU 461 returns to the step S2402. On the other hand, if the job has been completed, the CPU 461 determines in a step S2404 whether or not there is a sub-maintenance item registered as a maintenance reserved item. If there is no sub-maintenance item registered as a maintenance reserved item, the CPU 461 returns to the step S2401, and awaits another job.

If it is determined that there is a sub-maintenance item registered as a maintenance reserved item in the step S2404, i.e. if maintenance based on a maintenance item was performed during execution of the job, and a sub-maintenance item associated with the maintenance item is registered as a maintenance reserved item, the CPU 461 displays the screen (FIG. 16D) for configuring and performing maintenance based on the sub-maintenance item in a step S2405. Then, the CPU 461 awaits selection of "OK", i.e. input for configuration of maintenance and instruction of execution of maintenance via the screen. When "OK" has been selected, the CPU 461 configures and carries out maintenance based on the sub-maintenance item in a step S2407. Then, in a step 2408, the CPU 461 displays the in-maintenance screen (FIG. 16A or 16B) of the sub-maintenance. The in-maintenance screen displayed here varies depending on the type of the selected sub-maintenance item, as described hereinabove.

Then, in a step S2409, the CPU 461 determines whether or not the maintenance has been completed. When the screen shown in FIG. 16B is displayed in the step S2409, i.e. when the selected maintenance item is a type in which completion of maintenance is determined by the CPU 461 based on an input operation using the "Completion" key by the user, the CPU 461 determines, upon depression of the "Completion" key by the user on the screen in FIG. 16B, that the maintenance has been completed. If it is determined that the maintenance has not been completed, the CPU 461 returns to the step S2408, wherein it is determined whether or not there is another sub-maintenance item registered as a maintenance reserved item.

As described above, according to the present embodiment, a table listing a plurality of maintenance items and sub-maintenance items associated with the maintenance items is stored; when maintenance based on a maintenance item selected from the plurality of maintenance items is completed, it is determined by referring to the table whether or not there is a sub-maintenance item associated with the selected maintenance item, and if there is a sub-maintenance item associated with the selected maintenance item, the sub-maintenance item is displayed on the liquid crystal display 420. Therefore, the present embodiment makes it possible to prevent a user from forgetting to perform maintenance based on a sub-maintenance item based on which maintenance should be necessarily performed after execution of maintenance based on a maintenance item, such as component replacement, cleaning, or adjustment.

Further, since sub-maintenance items associated with maintenance items are hierarchized in accordance with an order in which maintenance should be performed on them, the user cannot err in his/her judgement as to the order of performing maintenance based on related sub-maintenance items.

Furthermore, it is possible to select whether or not maintenance based on a sub-maintenance item should be performed immediately after termination of maintenance based on the related maintenance item during execution of a job or after completion of a job being executed, and thus, maintenance operation can be performed in accordance with the situation. Moreover, even when it is selected to perform maintenance based on a sub-maintenance item after completion of a job, the screen is displayed for configuring and executing maintenance based on the sub-maintenance item after completion of the job, so that it is possible to reliably perform the maintenance based on the sub-maintenance item after completion of the job.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the present embodiment, and hence the storage medium on which the program code is stored constitutes the present invention.

Examples of the storage medium for supplying the program code include a RAM, a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, a ROM, and an EEPROM.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

Furthermore, the present invention may be applied to a system comprised of a plurality of apparatuses or to an apparatus formed by a single apparatus.

Further, a system or an apparatus may be supplied with a program code of software which realizes the functions of the above described embodiment by downloading the program code from a database on a network by a communication program, so that the system or the apparatus can have the advantageous effects of the present invention.

The present invention is not limited to the above described embodiment, but can be modified in various manners based on the subject matter of the present invention, which should not be excluded from the scope of the present invention.

What is claimed is:

1. An image forming system that is capable of forming images on sheets and performing post-processing on the sheets, comprising:
- a display unit;
- a storage unit that stores a plurality of maintenance items, and sub-maintenance items associated with respective ones of the maintenance items;
- a selecting unit that selects a maintenance item to be completed, out of the maintenance items;
- a determining unit that determines whether or not there is at least a corresponding sub-maintenance item that corresponds to the selected maintenance item and is required to be completed after and in response to completion of the selected maintenance item, by referring to said storage unit, based on the selected maintenance item; and
- a display control unit that is responsive to a determination of said determining unit that there is the corresponding sub-maintenance item, for causing said display unit to display a message prompting a user to execute the corresponding sub-maintenance item after completion of the selected maintenance item,
- wherein the maintenance items and the sub-maintenance items are maintenance actions.

2. An image forming system as claimed in claim 1, further comprising an input unit that enables the user to input an instruction for termination of a maintenance operation associated with one of the maintenance items or sub-maintenance items, and wherein said determining unit is responsive to the instruction for termination of the maintenance operation via said input device, for determining that the maintenance operation has been completed.

3. An image forming system including a plurality of processing modules that perform respective different operations, comprising:

a storage unit that stores a plurality of maintenance items, and sub-maintenance items associated with respective ones of the maintenance items, for each of the plurality of processing modules;

a selecting unit that selects a maintenance item to be completed for a selected processing module, out of the maintenance items;

a determining unit that determines whether or not there is at least a corresponding sub-maintenance item for the selected processing module that corresponds to the selected maintenance item and is required to be completed after and in response to completion of the selected maintenance item, by referring to said storage unit, based on the selected maintenance item; and a display control unit that is responsive to a determination of said determining unit that there is the corresponding sub-maintenance item for the selected processing module, for causing a display device to display a message prompting a user to execute the corresponding sub-maintenance item for the selected processing module after completion of the selected maintenance item, wherein the maintenance items and the sub-maintenance items are maintenance actions.

4. A non-transitory computer-readable storage medium storing a program that when executed by a computer in an image forming system causes the image forming system to execute a maintenance method, the image forming system including a storage unit that stores a plurality of maintenance items, and sub-maintenance items associated with respective ones of the maintenance items, and being capable of forming images on sheets and performing post-processing on the sheets, the method comprising:

a selecting step of selecting a maintenance item to be completed, out of the maintenance items;

a determining step of determining whether or not there is at least a corresponding sub-maintenance item that corresponds to the selected maintenance item and is required to be completed after and in response to completion of the selected maintenance item, by referring to said storage unit, based on the selected maintenance item; and a display control step of causing a display unit to display a message prompting a user to execute the corresponding sub-maintenance item after completion of the selected maintenance item, in response to a determination in said determining step that there is the corresponding sub-maintenance item, wherein the maintenance items and the sub-maintenance items are maintenance actions.

5. A non-transitory computer-readable storage medium storing a program that when executed by a computer in an image forming system causes the image forming system to execute a maintenance method, the image forming system including a plurality of processing modules that perform respective different operations, and a storage unit that stores a plurality of maintenance items, and sub-maintenance items associated with respective ones of the maintenance items, for each of the plurality of processing modules, and being capable of carrying out maintenance operation based on one of the processing modules that is not used in a job, during execution of the job, the method comprising:

a selecting step of selecting a maintenance item to be completed for a selected processing module, out of the maintenance items;

a determining step of determining whether or not there is at least a corresponding sub-maintenance item for the selected processing module that corresponds to the selected maintenance item and is required to be completed after and in response to completion of the selected maintenance item, by referring to said storage unit, based on the selected maintenance item; and a display control step of causing a display unit to display a message prompting a user to execute the corresponding sub-maintenance item for the selected processing module after completion of the selected maintenance item, in response to a determination in said determining step that there is the corresponding sub-maintenance item for the selected processing module, wherein the maintenance items and the sub-maintenance items are maintenance actions.

* * * * *